United States Patent
Jensen

(10) Patent No.: US 12,270,690 B2
(45) Date of Patent: Apr. 8, 2025

(54) NEGATIVE SPACE FUEL TANK GAUGING SYSTEM AND ULLAGE GAS CONTROL

(71) Applicant: Parker-Hannifin Corporation, Cleveland, OH (US)

(72) Inventor: Bryan Jensen, Buckeye, AZ (US)

(73) Assignee: Parker-Hannifin Corporation, Cleveland, OH (US)

( * ) Notice: Subject to any disclaimer, the term of this patent is extended or adjusted under 35 U.S.C. 154(b) by 564 days.

(21) Appl. No.: 17/516,912

(22) Filed: Nov. 2, 2021

(65) Prior Publication Data
US 2022/0136876 A1 May 5, 2022

Related U.S. Application Data

(60) Provisional application No. 63/108,970, filed on Nov. 3, 2020.

(51) Int. Cl.
| | |
|---|---|
| *G01F 1/34* | (2006.01) |
| *B01D 53/22* | (2006.01) |
| *B64D 37/02* | (2006.01) |
| *B64D 37/32* | (2006.01) |
| *G01F 22/00* | (2006.01) |

(52) U.S. Cl.
CPC .............. *G01F 1/34* (2013.01); *B01D 53/22* (2013.01); *B64D 37/02* (2013.01); *B64D 37/32* (2013.01); *G01F 22/00* (2013.01); *B01D 2053/224* (2013.01)

(58) Field of Classification Search
CPC ........... G01F 1/34; G01F 22/00; B01D 53/22; B01D 2053/224; B64D 37/02; B64D 37/32
See application file for complete search history.

(56) References Cited

U.S. PATENT DOCUMENTS

| | | | |
|---|---|---|---|
| 6,993,966 B2 | 2/2006 | Stenmark | |
| 8,196,481 B2 | 6/2012 | Peukert et al. | |
| 10,060,781 B2 | 8/2018 | Nguyen et al. | |
| 2003/0110836 A1* | 6/2003 | Cho | F02M 25/0818 73/40.7 |

(Continued)

FOREIGN PATENT DOCUMENTS

| | | |
|---|---|---|
| DE | 8806777 U1 | 7/1988 |
| FR | 2629913 B1 | 8/1991 |

*Primary Examiner* — Alexander Satanovsky
*Assistant Examiner* — Sharah Zaab
(74) *Attorney, Agent, or Firm* — Renner, Otto, Boisselle & Sklar, LLP

(57) ABSTRACT

A fuel gauging system for a fuel tank containing fuel and an ullage gas in an ullage of the tank. The fuel gauging system pressurizes/depressurizes the ullage gas and measures changes in conditions of the ullage gas to determine ullage gas volume and thus volume of the fuel. The system may infer one or more values in the volume calculation to reduce the number of measurements involved. The inferred values may come from known operating characteristics of an inerting system integrated with the fuel gauging system. The system may use a control valve that operates within the limits of a climb-dive valve to generate the system response. The control valve may control delivering or receiving ullage gas from another tank to preserve the ullage gas. An inerting system may be integrated into such a paired-tank fuel gauging system.

18 Claims, 13 Drawing Sheets

(56) References Cited

U.S. PATENT DOCUMENTS

| | | | | |
|---|---|---|---|---|
| 2010/0108811 A1* | 5/2010 | Gupta | ................... | B64D 37/32 |
| | | | | 62/7 |
| 2011/0263035 A1* | 10/2011 | Beeson | ................. | G01N 27/16 |
| | | | | 422/111 |
| 2013/0098451 A1* | 4/2013 | Krug | ..................... | B64D 37/32 |
| | | | | 137/1 |
| 2015/0217153 A1* | 8/2015 | Jones | ...................... | A62C 3/08 |
| | | | | 169/62 |
| 2017/0038238 A1* | 2/2017 | Nguyen | ................... | G01F 9/00 |

\* cited by examiner

NEGATIVE SPACE FUEL TANK GAUGING SYSTEM AND ULLAGE GAS CONTROL

RELATED APPLICATIONS

This application claims the benefit of U.S. Provisional Application No. 63/108,970 filed Nov. 3, 2020, which is hereby incorporated herein by reference in its entirety.

TECHNICAL FIELD

The present disclosure relates to fuel gauging and, more particularly, to a unique way of measuring negative space and fuel quantity in a fuel tank without directly contacting the fuel in the tank, and even more particularly to also controlling the quantity of ullage gas in the fuel tank.

BACKGROUND

The amount of fuel carried onboard an aircraft must be known by the flight crew. Less apparent is the need to measure fuel volume for other tasks such as refueling an aircraft, or in unusual cases, defueling an aircraft. In any case, conventional fuel gauging systems provide the hardware and software required to accurately measure fuel quantity and deliver this information to the aircraft flight deck and other data users.

One conventional way to measure the quantity of fuel in an aircraft fuel tank is by determining the location and orientation of the free surface of the liquid fuel inside the tank. The free surface of liquid fuel moves up and down with changes in the liquid volume, and if the location and orientation of the free surface is known relative to the tank geometry, a calculation can be performed to determine the volume of liquid fuel onboard.

One such aircraft fuel gauging system, such as that produced by Parker Fluid Systems Division in Hauppauge, N.Y., uses a matrix of capacitance probes located inside the fuel tank for locating the free surface of the liquid fuel in the tank. Each one of the capacitance probes is itself a fuel level sensor, and a matrix of these probes is used to determine the location of the free surface in three-dimensional space inside the fuel tank. Unlike measuring the free surface height in a stationary tank where a single level sensor can be used with some confidence, a fuel level sensing system in a dynamic environment, such as an aircraft with partitioned fuel tanks of complex geometry, utilizes an array of capacitance probes to determine the exact location of the free surface in three-dimensional space. Each capacitance probe in the system communicates with a network of electronic hardware to process the signals generated by the probes. The number of capacitance probes and the interconnecting hardware can pose challenges for reliability, maintainability and weight.

U.S. Pat. No. 10,060,781 ("Nguyen et al.") describes a method that measures the quantity of liquid fuel in a fuel tank without the use of capacitance probes. The method includes the following steps performed while fuel is flowing out of the fuel tank: changing a volume of gas in the fuel tank (e.g., by injecting or venting gas) during a time interval; measuring a rate of change of the volume of gas in the fuel tank during the time interval; measuring a rate of flow of fuel out of the fuel tank during the time interval; measuring a first pressure and a first temperature of the gas in the fuel tank at the start of the time interval; measuring a second pressure and a second temperature of the gas in the fuel tank at the end of the time interval; and calculating a quantity of fuel in the fuel tank based on the acquired measurement data.

SUMMARY

An aspect of the present disclosure provides one or more improvements over conventional fuel gauging systems such as those described above.

According to one aspect, the present disclosure provides a system and method that is simpler in its approach of calculating the quantity of liquid fuel in a tank compared to that described by Nguyen et al. The exemplary system does this without the use of capacitance probes by treating the ullage gas inside the tank like a pneumatic spring and infers at least some conditions of temperature and mass flow rate of the ullage gas, such that only pressure changes of the ullage gas over a measurement interval are needed to determine the ullage volume and thus the quantity of liquid fuel in the tank. Such functionality may be realized by introducing a supply of ullage gas into the ullage over the measurement interval, measuring the corresponding increase in ullage gas pressure over the interval, and calculating the volume of ullage gas by inferring at least some values in the change in temperature and/or mass flow rate of the ullage gas. Alternatively or additionally, the ullage may be depressurized in a similar fashion wherein the corresponding reduction in ullage pressure is measured. Such an approach provides a simpler design than Nguyen et al. by reducing the number measurements required and the computing power involved.

Thus, according to an aspect, a fuel gauging system includes: a fuel tank configured to contain liquid or solid fuel and an ullage gas in an ullage of the fuel tank; at least one fluid conduit fluidly connected to the fuel tank; a pressure sensor configured to measure a pressure of the ullage gas; a control valve fluidly connected to the at least one fluid conduit, the control valve being configured to control flow of ullage gas into or out of the fuel tank to change a pressure of the ullage gas in the fuel tank; and at least one electronic processor configured to: (i) receive pressure readings from the pressure sensor over a measurement interval, (ii) calculate a change in pressure of the ullage gas in the fuel tank over the measurement interval based upon the pressure readings, and (iii) calculate a quantity of the liquid fuel in the fuel tank based at least upon: (a) the calculated change in pressure of the ullage gas in the fuel tank over the measurement interval, (b) at least one inferred temperature value in a calculation of temperature change of the ullage gas in the fuel tank over the measurement interval, and (c) at least one inferred mass value or mass flow rate value in a calculation of mass or mass flow rate change of the ullage gas into and/or out of the fuel tank over the measurement interval.

In exemplary embodiments, the inferred temperature and/or mass flow rate value(s) may be inferred from operating characteristics of an inerting gas system that is integrated with the fuel gauging system. For example, the integrated system may utilize a flow control orifice of the inerting system to infer the mass flow rate through the system.

In exemplary embodiments, the system and method utilizes successive pressurization and depressurization of the ullage gas in the tank to generate a corresponding pressure response that is used to provide a usable signal for another metric of interest, such as mass flow rate.

In exemplary embodiments, a control valve is used to charge or discharge the ullage pressure in the tank. The control valve generally may operate within the limits of a climb-dive valve to generate the appropriate response without loss of ullage overboard via a vent, which is yet another advantage over the system and method described by Nguyen et al.

According to another aspect, the present disclosure provides a system and method that is more sophisticated in its approach than that disclosed by Nguyen et al. For example, instead of venting ullage gas overboard to atmosphere, the exemplary system and method disclosed herein preserves the valuable ullage gas by sending and retrieving it from another tank. In this manner, the at least two tanks are used simultaneously, wherein one tank is pressurized while the other tank is depressurized. The cycle is then reversed. In this way, a fixed quantity of gas can be transferred back and forth between the tanks. Such a system can preserve the reduced oxygen concentration in an aircraft with a fuel tank inerting system.

Thus, according to an aspect, a fuel gauging system includes: a first tank configured to contain liquid or solid fuel and an ullage gas in an ullage of the first tank; a second tank fluidly connected to the first tank via at least one fluid conduit for transporting ullage between the first and second tank; a control valve fluidly connected to the at least one fluid conduit, the control valve being configured to control the transport of ullage gas between the first tank and the second tank; at least one sensor configured to measure at least one of: (i) temperature of the ullage gas in the first tank; (ii) pressure of the ullage gas in the first tank; and (iii) mass flow rate of ullage gas into or out of the first tank; and at least one electronic processor configured to calculate a quantity of the liquid fuel in the first tank based at least upon measurement data from the at least one sensor.

In exemplary embodiments, the system may be introduced into an aircraft, and may work especially well on an aircraft with paired fuel tanks. Moreover, this system may be integrated with a fuel tank inerting system. In the case of an air separation module (ASM) inerting system, the discharge stream from the inerting system could be used in combination with an ejector pump to drive some or all of the flow between tanks. In the case of a catalytic inerting system (CIS), the blower used to drive the circulating flow of ullage gas through the inerting system could also be used to drive the flow between tanks.

According to another aspect, a method of determining a quantity of fuel in a system, includes: generating a measurable pressure differential in an ullage of a first fuel tank over a measurement interval; determining a change in pressure in the ullage over the measurement interval; determining a change in mass of the ullage gas or mass flow rate in the ullage over the measurement interval; determining a change in temperature of the ullage gas in the first fuel tank over the measurement interval; and calculating a volume of fuel in the first fuel tank by calculating a volume of the ullage gas using the determined change in pressure, the determined change in mass or mass flow rate, and the determined change in temperature of the ullage gas;
wherein the generating the measurable pressure differential includes supplying ullage gas from a second tank fluidly connected to the first tank, and discharging ullage gas from the first tank to second tank.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects according to the present disclosure have particular application to fuel tank inerting systems for aircraft, and thus will be described below chiefly in this context. It is understood, however, that principles and aspects according to the present disclosure may be applicable to other inerting systems generally, or may be applicable to a wide variety of applications for measuring the quantity of liquid or solid fuel without direct interrogation, such as aerospace, automotive, industrial applications, or the like.

Figure 1:
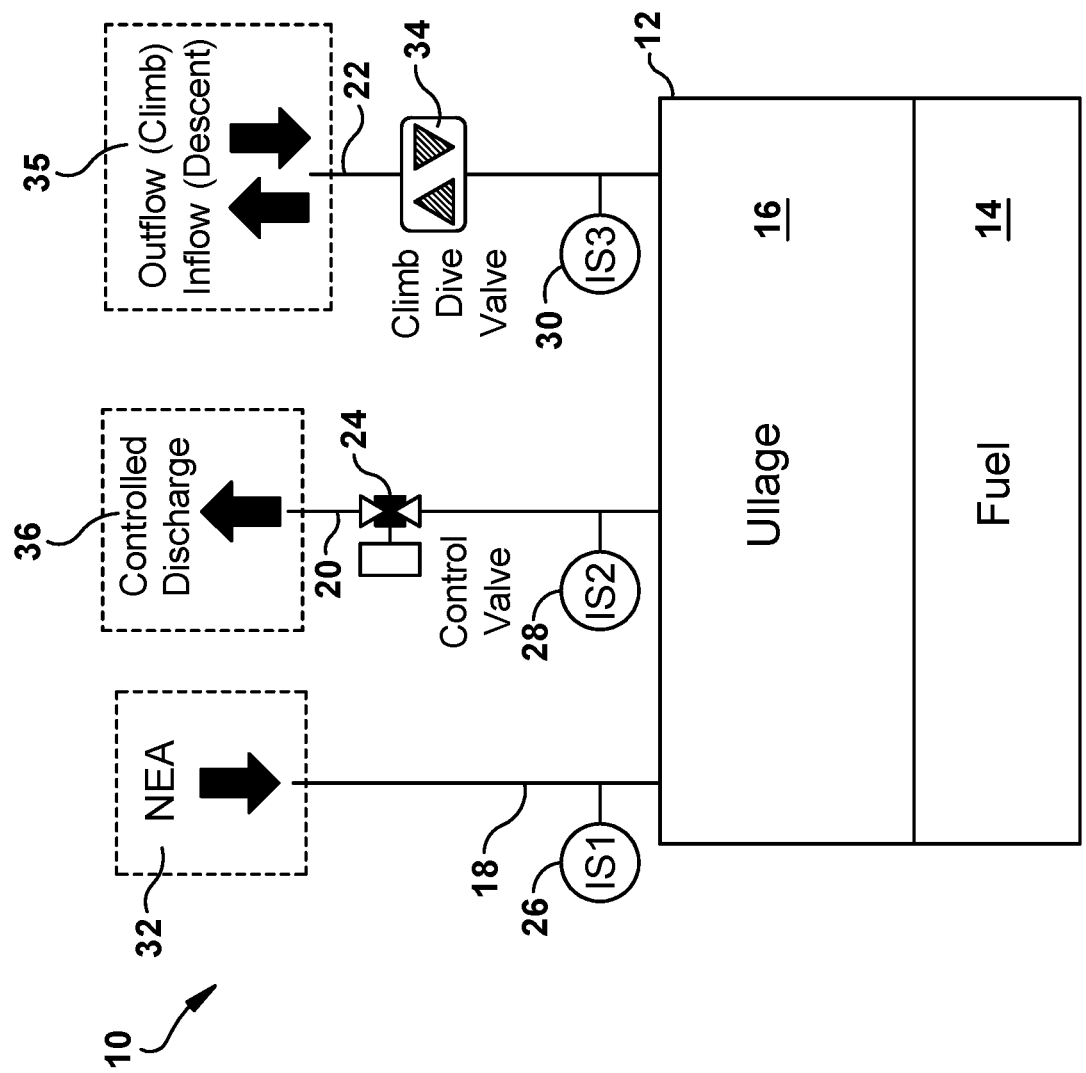
FIG. 1 is schematic diagram of an exemplary fuel gauging system according to an embodiment of the present disclosure.

Referring to FIG. 1, an exemplary fuel gauging system 10 is shown. The fuel gauging system 10 includes a fuel tank 12 containing an incompressible (non-gaseous, liquid or solid) fuel 14 and an ullage gas 16 in an ullage (also referred to as a negative space with the same reference 16) of the fuel tank 12. The system 10 also includes at least one fluid conduit (18, 20, 22) fluidly connected to the fuel tank 12 for ingress or egress of the ullage gas 16, at least one control valve 24 configured to control flow of ullage gas into or out of the fuel tank 12, and instrumentation (e.g., 26, 28, 30) that is configured to determine the quantity of fuel 14 or fuel level in the fuel tank 12 without the use of capacitance probes, or other electronics physically contacting the fuel 14 inside the tank 12.

The fuel 14 may be any suitable type of fuel, including conventional liquid jet fuel or other forms such as synthetic fuel. The fuel tank 12 may include any suitable structure for containing the fuel. In some aircraft, the fuel tank 12 may be integrated into the wings, and may contain multiple compartments that are fluidly connected together. As is conventional, the fuel tank 12 may have a fuel outlet (not shown)

for transporting the fuel to the engine for combustion. A fuel pump (not shown) also may be provided for facilitating the transportation of the fuel.

The ullage gas 16 may be any suitable gas from any suitable source depending on the application, which includes, but is not limited to, air, nitrogen-enriched air, $N_2$, $CO_2$, etc. In an aircraft system, the ullage gas 16 generally is an inert gas having a reduced oxygen content that displaces oxygen-rich air or fuel vapors in the tank to reduce flammability in the ullage of the tank 12. The inert ullage gas 16 may include any suitable non-flammable gas that is non-reactive with the fuel 14, such as nitrogen, nitrogen-enriched air, noble gas, or the like. In exemplary embodiments, the inert ullage gas 16 includes nitrogen-enriched air (NEA) which may be delivered to the tank via any suitable source 32, such as an inerting system fluidly connected to the tank. The inerting system (source 32) may include an air separation module (ASM) or a catalytic inerting system (CIS), for example, which are conventional in the art. The ASM-based inerting system may use hollow fiber membranes that extract oxygen from the air (such as bleed air from the aircraft engine) to produce the NEA. The CIS may be a closed-loop system that draws ullage gas 16 from the fuel tank 12, reacts the gas stream in a catalytic converter, cools the gas stream, removes the water, and returns the inert products (NEA) of the reaction back to the fuel tank 12. Exemplary embodiments showing these systems integrated with a fuel gauging system are described in further detail below, particularly with reference to FIGS. 8-13.

In the illustrated embodiment, the ullage gas 16 (e.g., NEA) is delivered from the source 32 to the tank 12 via first (intake) fluid conduit 18 that is connected by a port or other penetration in the tank 12. As shown, the system 10 also includes second fluid conduit 22 with a climb-dive valve (CDV) 34 that is configured to depressurize or pressurize the tank 12 based on over-pressurization or under-pressurization events, such as due to altitude changes of the aircraft. The second fluid conduit 22 is open to atmosphere 35 for venting ullage gas overboard, or for permitting inflow of outside air. During elevational climbing of the aircraft, the CDV 34 will vent ullage gas 16 overboard to depressurize the tank 12 when the pressure exceeds an upper limit. During elevational descent, the CDV 34 may permit inflow of outside air to add pressure to the tank and prevent an excessive negative pressure. The CDV 34 is provided with preset upper limits for opening or closing the CDV for outflow of ullage gas 16, and preset lower limits for opening or closing the CDV for inflow of air. As such, the CDV 34 also may open to vent ullage gas 16 during other overpressure conditions, such as when introduction of ullage gas 16 into the tank 12 exceeds the maximum preset pressure limit. Likewise, the CDV 34 also may open to introduce air into the tank 12 during other under-pressure conditions, such as if ullage gas 16 is drawn or pumped out of the tank 12 and pressure falls below the preset lower limit.

Figure 2:
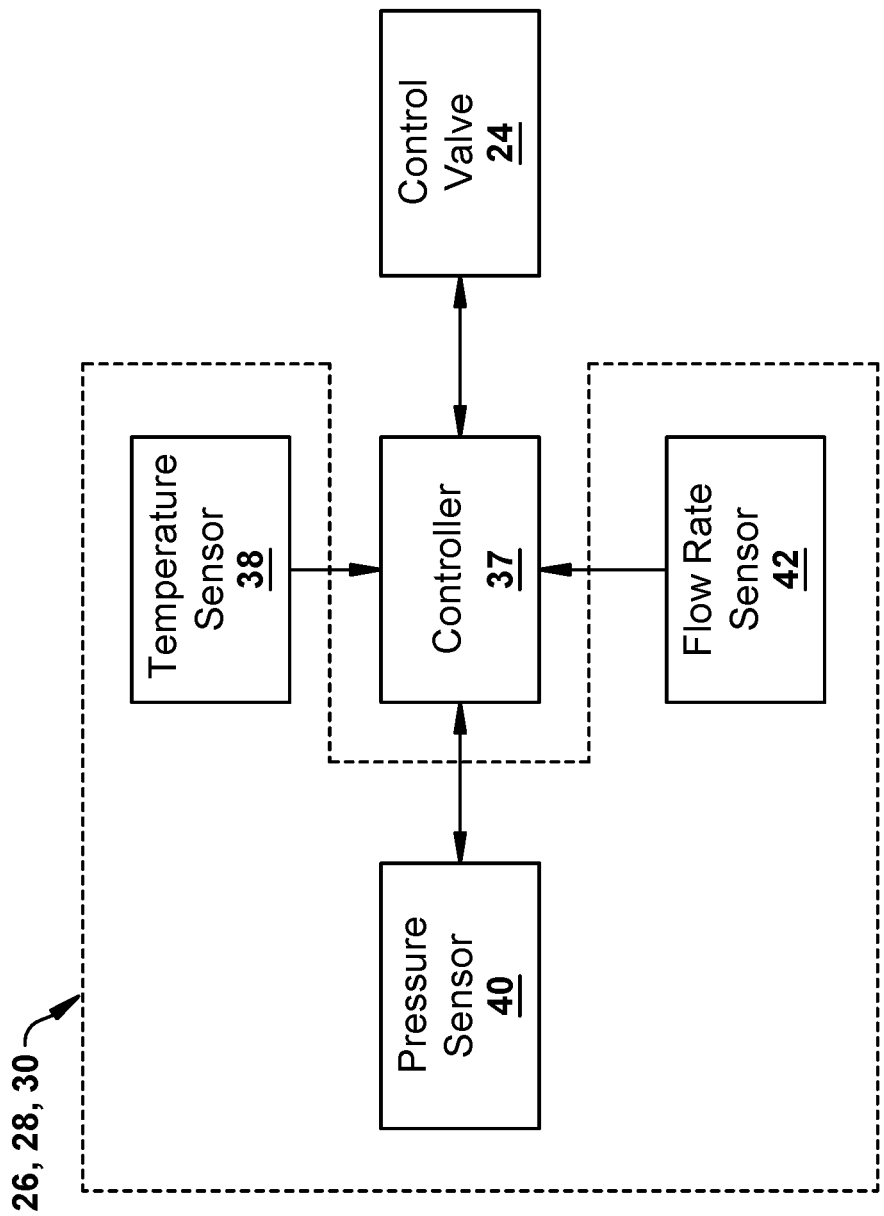
FIG. 2 is a schematic diagram of exemplary instrumentation, including sensors and controller, which may be used in the fuel gauging systems described herein.

As shown in the illustrated embodiment, the fuel gauging system 10 also includes third (discharge) fluid conduit 20 with the control valve 24 connected therein for permitting controlled discharge of ullage gas 16 from the tank 12 to another location 36. The control valve 24 may be any suitable valve (such as a one-way valve, two-way valve, directional control valve, or the like) that provides opening or closing of the third fluid conduit 20 for discharging ullage gas 16 from tank 12. The control valve 24 may be an electrically-operable valve that controls flow parameters in response to an input signal received from at least one controller 37 (FIG. 2). The control valve 24 may be an on/off valve, or may be a proportional valve. Although shown in the third fluid conduit 20 (discharge line) for controlling discharge of the ullage gas 16, alternatively or additionally the first (input) fluid conduit 18 may include the control valve 24 for controlling the inflow quantity of ullage gas 16 in accordance with the method for determining the quantity of fuel 14 in the tank 12, as described in further detail below.

Referring to FIG. 2, the instrumentation 26, 28, 30 for determining the quantity of liquid fuel in the tank generally may include the at least one controller 37 (or electronic processor 37) and one or more sensors configured to measure (i) temperature of the ullage gas in the tank (temperature sensor 38), (ii) pressure of the ullage gas in the tank (pressure sensor 40), and/or (iii) mass flow rate of ullage gas into or out of the tank (flow rate sensor, or mass flow meter, 42). Additional sensor(s) may include an oxygen concentration sensor (not shown) if the oxygen concentration of the ullage gas is desired to determine an accurate gas constant value, R, for example. The sensor(s) 38, 40, 42 measure the respective conditions of the ullage gas 16 and communicate their readings to the at least one controller or processor 37. The at least one controller or processor 37 may include multiple controllers or processors, each dedicated to one or more of the instrumentation 26, 28, 30; and/or the at least one controller or processor 37 may include a central processing unit that receives the readings from the various sensors of the instrumentation 26, 28, 30 throughout the system 10. As shown, the at least one controller 37 may be operatively connected to the control valve 24 to control flow into or out of the tank, which may be in accordance with the measurements from the sensor(s).

Turning back to FIG. 1, the instrumentation 26, 28, 30 (also referred to as instrumentation sets, "IS") may be fluidly connected to one or more of the fluid conduits 18, 20, 22 for making the desired measurements of the ullage gas 16 in the tank 12. Generally, the sensor(s) (e.g., 38, 40, 42) of the respective instrumentation may be disposed along the respective fluid conduit(s) 18, 20, 22 at or near where the mass ullage gas flow is introduced or discharged from the tank 12. In this manner, the sensors (e.g., 38, 40, 42) obtain an accurate reading of the conditions inside the tank 12, with the sensors and associated electrical components being outside of the fuel tank 12 and not in direct contact with the fuel 14. In the illustrated embodiment, the instrumentation 26, 28, 30 operatively coupled to the respective fluid conduits 18, 20, 22 has one or more of the temperature sensor 38, pressure sensor 40, flow rate sensor 42, or other sensor(s) (e.g., oxygen sensor), which may be used for a suitably accurate measurement of the ullage gas 16 going into or out of the tank 12. It is understood that fewer or greater sensors (e.g., 38, 40, 42) may be deployed with each of the fluid conduits 18, 20, 22, and there may be fewer or greater number of fluid conduits 18, 20, 22, as may be desired for the particular application.

To determine the quantity of fuel 14 in the tank 12, the fuel gauging system 10 uses the control valve 24 to generate a pressure differential of the ullage gas 16 in the tank 12, and uses the instrumentation (e.g., 26, 28 and/or 30) to calculate a volume of the ullage gas 16 in the tank by measuring one or more conditions of the ullage gas over a measurement interval of this period of time.

Because the ullage gas 16 is compressible, a given mass of ullage gas will decrease its volume when pressure increases according to the ideal gas law:

$$PV=mRT$$

where P is pressure of the ullage gas in the tank, V is volume of the ullage gas in the tank, m is the mass of ullage gas in the tank, T is temperature of the ullage gas in the tank, and R is the universal gas constant of 8.314 J·K$^{-1}$·mol$^{-1}$ divided by the molar mass of the gas. When in SI units, P is measured in pascals, V is measured in cubic meters, m is measured in grams, and T is measured in Kelvins.

In contrast to the compressibility of the ullage gas 16, the non-gaseous fuel 14 (e.g., liquid or solid fuel) is incompressible, which means that when it is pressurized, its volume does not change. Accordingly, by treating the system 10 like a pneumatic spring and applying a change in pressure in the tank 12, the volume of ullage gas 16 can be determined over a measurement interval from time 1 (t1) to time 2 (t2) according to the following equation, where ṁ is the mass flow rate into or out of the tank 12:

$$V = \frac{\int \dot{m} dt R_2 T_2}{\frac{P_1 R_2 T_2}{R_1 T_1} - P_2}$$

In the above equation, the specific gas constant R is equivalent to the universal gas constant Ru divided by the molar mass (or molecular weight) of the particular gas. The specific gas constant, R, varies linearly with the molecular weight of the gas, and thus gas composition (especially oxygen concentration) can be used to calculate changes in R from time 1 to time 2.

In exemplary embodiments, the system 10 and its method can infer one or more conditions of the ullage gas 16 to populate the variables in the equation above to reduce the number of measurements and computing power involved. For example, in exemplary embodiments the system 10 may infer at least one temperature value in the calculation of temperature change of the ullage gas 16 in the fuel tank 12 over the measurement interval, and/or can infer at least one value of mass or mass flow rate in a calculation of mass or mass flow rate change of the ullage gas 16 into and/or out of the fuel tank over 12 the measurement interval. The gas composition and at least one R value also can be inferred. For example, in the context of an NEA ullage gas, the specific gas constant varies from that of air (0.287 J g$^{-1}$ K$^{-1}$) for the un-inerted ullage to a slightly lower value (0.282 J g$^{-1}$ K$^{-1}$) when all of the oxygen has been displaced by nitrogen. Thus, not measuring oxygen concentration and inferring the value of R would introduce less than a 2% error into the measurement.

By way of example, if ṁ, R and/or T remain constant during the inflow or outflow of ullage gas 16 to or from the tank 12 during the pressurization or depressurization, then the above-equation simplifies to:

$$V = \frac{\dot{m} \Delta t R T}{\Delta P}$$

In such a system, only one value of ṁ, R and T need to be populated in the above equation, along with the change in pressure (ΔP) over the measurement interval (Δt), to calculate the volume (V) of the ullage gas 16. Once the volume of the ullage gas 16 in the tank is determined, the volume of fuel 14 in the tank is determined by subtracting the known volume of the tank 12 from the calculated volume of the ullage gas 16.

The inferred value(s) of temperature (T), mass flow rate (ṁ) (or mass), and/or gas composition may be accomplished in numerous ways. According to one method, for example, the calculation of temperature change (e.g., ΔT, or T$_2$-T$_1$) is accomplished by using the temperature sensor 38 to record the temperature of ullage gas 16 in the tank either at the beginning (T$_1$) or end (T$_2$) of the measurement interval and infer that the temperature remained constant over the interval such that the other beginning (T$_1$) or ending (T$_2$) value is known based on the assumption of constant temperature. For example, provided that the measurement interval is sufficiently short (e.g., on the order of seconds to a minute, or two) or during conditions when temperature and gas composition do not vary greatly, the ullage temperature can accurately be assumed to not vary much during the measurement interval. Under those conditions with minimal variance from time 1 (t1) to time 2 (t2), it may be possible to use a single measurement of temperature (either T$_1$ or T$_2$) for the entire measurement interval. Likewise, a change in mass or mass flow rate (e.g., Δṁ, or ṁ$_2$-ṁ$_1$) of the ullage gas 16 may be inferred in a similar way by measuring one value (either ṁ$_1$ or ṁ$_2$) with flow rate sensor 42 and assuming a constant to determine the other value over the interval. Similarly, gas composition also can be inferred in such a way, such as by using an oxygen sensor or the like.

An alternative or additional method to determine inferred values in the equation above is based on known operating conditions of a system or component that is integrated with the fuel gauging system 10. For example, if an inerting system (e.g., ASM or CIS) is integrated with the fuel gauging system 10, and the inerting system outputs inert ullage gas at a known temperature, then this known temperature can be used to infer one or more of the temperature values in the equation. As another example, a flow control orifice operating at a constant pressure may be integrated with the fuel gauging system 10, or as an output to the inerting system integrated with the fuel gauging system 10, to establish a known controlled flow rate into the fuel tank 12. Thus, the mass flow rate value(s) can be inferred and populated into the equation in this way. Similarly, gas composition can be inferred in such a way based on operating conditions of the inerting system. Moreover, with regard to the volume flow of (liquid) fuel out of the tank 12 during the measurement interval, it is likely to be small but could be comprehended in the analysis by using data already available in the engine controller without requiring additional sensors.

It is understood, of course, that a combination of the foregoing features could be employed. By way of non-limiting example, because current inerting systems typically employ a choked orifice for flow tuning, this device delivers a known quantity of inert gas if the upstream pressure, temperature and gas composition are known or measured. In this way, the flow control orifice would effectively become a flow meter from which the total amount of mass flow across it could be computed knowing the flow characteristics of the orifice, the upstream pressure, the upstream temperature and the gas composition. The inerting system already embodies the hardware for these measurements, which could circumvent the need for these instruments or a mass flow meter in the fuel gauging system 10. In addition, because it is the temperature of the ullage gas 16 in the tank 12 that provides an accurate measurement of the quantity of fuel 14, a temperature sensor 38 could be employed on a discharge line in relatively close proximity to the tank 12 (e.g., conduit, or discharge line, 20). The benefit of using the temperature in the discharge line 20 is that it is likely a more accurate representation of the condition inside the tank, and ullage gas 16 discharged from the tank 12 can be assumed to be uniform and constant, so that by measuring $T_2$ (e.g., in discharge line 20 near the outlet), the initial temperature $T_1$ in the tank can accurately be inferred. Thus, in such a combined system, the flow rate ($\dot{m}$) is provided by the fixed restriction orifice of the inerting system and the one temperature measurement ($T_2$) in the discharge line is used to provide an accurate assessment of these parameters, which the other value of these parameters can be inferred from constant conditions. Thus, only the readings and calculation of the pressure change ($\Delta P$) (e.g., measured in the discharge line with temperature) over the measurement interval remains for calculating the ullage volume, and thus the remaining quantity of liquid fuel.

It is of course appreciated that additional values of temperature, mass or mass flow rate, and/or gas concentration may be taken at other points in the measurement interval, or a rate of change, or integral of such values may be determined over the measurement interval, or the like. For example, the fuel gauging system 10 may measure a first ullage pressure and a first ullage temperature at a first condition (e.g., at the beginning of the measurement interval). These measurements may be taken before the conditions of the fuel tank 12 are modified by the gauging system. Next, the gauging system 10 creates a pressure differential in the ullage by either pressurizing or depressurizing the ullage gas 16. In doing so, the gauging system 10 can measure a mass gas flow into, or out of, the ullage. Once a predetermined mass of ullage gas is introduced, or removed, from the ullage, the fuel tank 12 is at a second condition. The gauging system 10 may then measure a second ullage pressure and a second ullage temperature at the second condition. As noted above, the mass ullage gas flow, the ullage temperature, and the ullage pressure measurements are all taken externally of the fuel tank 12. Using the above-noted equation and measurements taken at the first and second conditions, as well as the measured mass air flow introduced, or removed, from the ullage, the gauging system 10 can calculate the volume of the fuel 14 in the tank 12.

Figure 3:
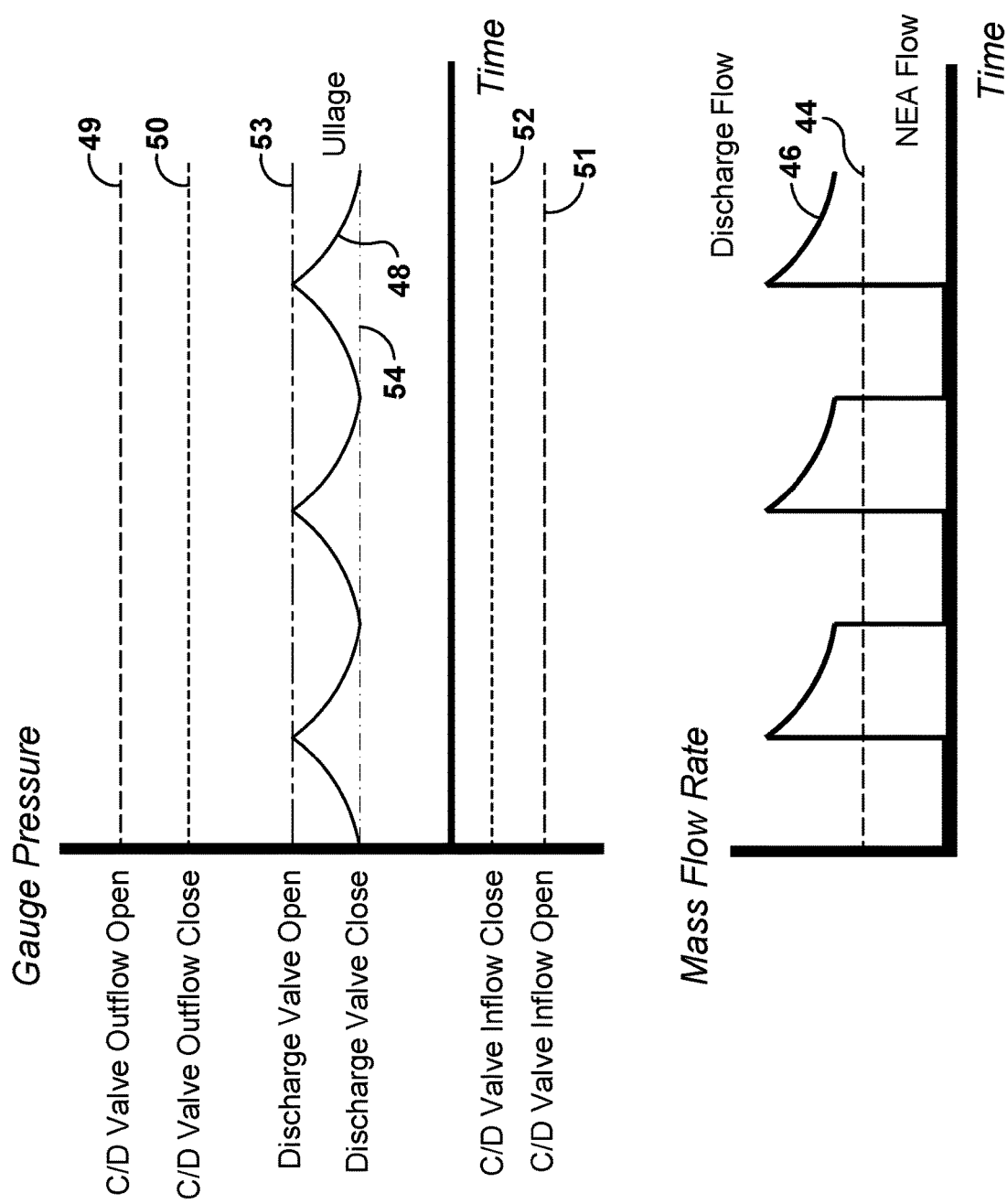
FIG. 3 shows an upper schematic diagram of pressure versus time illustrating the pressurization and depressurization of a fuel tank in accordance with an exemplary method of calculating fuel quantity according to an embodiment, and shows in a lower schematic diagram mass flow rate over time in response to the pressure changes caused by opening a discharge valve.

Referring to FIG. 3, presupposing that a steady stream of ullage gas 16 (e.g., NEA) is introduced into the fuel tank 12 and a discharge flow is duty-cycled with the control valve 24 via the discharge conduit 20 to allow a sequential pressurization and depressurization of the fuel tank 12, the characteristics of the mass air flow and the ullage pressure would follow the graphs shown. In the lower graph, the NEA flow rate is shown as the horizontal line 44 and the discharge ullage gas flow as the sawtooth line 46. The discharge flow rate would be a function of the pressure differential between the inside of the fuel tank 12 and the prevailing pressure at the opening of the discharge line 20. The discharge flow rate would start out at its highest point as the pressure differential (driving force) would be greatest just before the control valve 24 is opened and then it would taper off in a non-linear fashion as the pressure differential decreased. The upper graph in FIG. 3 shows the pressure signal of the ullage gas as the sawtooth line 48. The pressure line 48 is increasing when the control valve 24 in the discharge line 20 is closed and the fuel tank 12 is allowed to pressurize due to the incoming ullage gas (e.g., NEA) flow through the intake line (first conduit 18). The pressure line 48 decreases when the control valve 24 at the discharge line 20 is open and the ullage gas 16 in the fuel tank 12 is allowed to discharge through the discharge line 20.

Also shown in the upper pressure graph in FIG. 3 are the preset limit pressures at which the CDV 34 would open and close depending on the pressure differential across the fuel tank wall. As shown in the graph, and as discussed above, the CDV 34 is provided with preset upper limits for opening 49 or closing 50 the CDV for outflow of ullage gas, and preset lower limits for opening 51 or closing 52 the CDV for inflow of air during altitude changes. As shown, the successive pressurization and depressurization of the fuel tank 12 by opening 53 and closing 54 the control valve 24 operates within the preset limits of the CDV 34 to minimize the pressure "cross-talk" between the systems and enable the gauging system 10 to operate under most flight conditions without interference from the CDV 34.

Also evident in the lower graph in FIG. 3, is that by introducing ullage gas 16 into the ullage or allowing it to discharge from the ullage over a period of time creates an opportunity to get a "usable" signal of mass flow (line 46), which is to say that there is a sufficient quantity of totalized mass flow to be of practical significance. Such a frequency measurement could be a substitute for the totalized mass flow in the case where the mass flow rate is known or inferred, such as through a flow control orifice as described above. Such a usable signal may be desirable particularly when the fuel gauging system is implemented in combination with a conventional inerting system, such as an ASM-inerting system.

Because ullage gas 16 can be a valuable resource in an inerting system, it may be beneficial to preserve the ullage gas instead of venting it overboard the aircraft. Accordingly, in exemplary embodiments, the fuel gauging system 10 and method disclosed herein preserves the valuable ullage gas by sending and retrieving it from at least one other tank. In this manner, the at least two tanks are used simultaneously, wherein one tank is pressurized while the other tank is depressurized. The cycle is then reversed. In this way, a fixed quantity of gas can be transferred back and forth between the tanks. Such a system can preserve the reduced oxygen concentration in an aircraft with a fuel tank inerting system.

Figure 4:
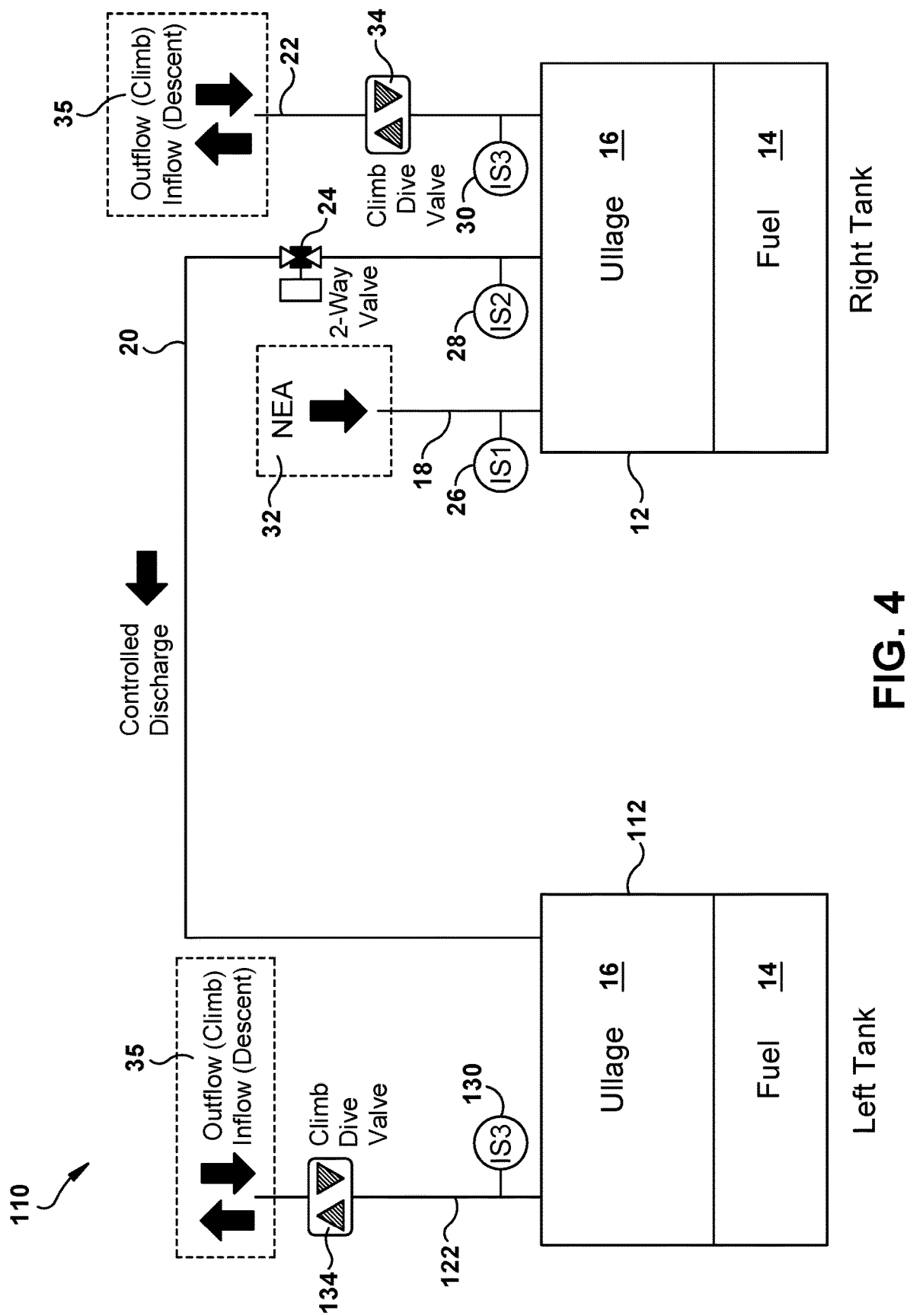
FIG. 4 is a schematic diagram of another exemplary embodiment of a fuel gauging system in which the system of FIG. 1 is fluidly connected to another tank for storing and retrieving ullage gas.

Referring to FIG. 4, another exemplary embodiment of a fuel gauging system 110 is shown in which the fuel tank 12 of the above-described system 10 is fluidly coupled via the fluid conduit 20 to another tank 112 for storing and retrieving ullage gas 16. Accordingly, in the illustrated embodiment, the control valve 24 is a two-way valve that permits controlled discharge of the ullage gas 16 out of the first tank into the second tank 112, and permits controlled inflow of ullage gas 16 from the second tank 112 into the first tank 12. The second tank 112 may be any suitable tank for storing the ullage gas 16, such as an accumulator or the like.

In the illustrated embodiment, the second tank 112 is a second fuel tank 12, such as a second tank in the other wing of an aircraft, in which the second tank 112 also contains fuel 114 (e.g. liquid or solid) and ullage gas 16 in an ullage of the second tank. Likewise, the system 110 also may include a second CDV 134 and associate instrumentation 130 fluidly coupled to conduit 122. To facilitate transportation of ullage gas between the tanks 12, 112, one or more blowers (not shown) or other suitable gas movers could be employed, which could be operated in forward or reverse (or operated alternating in opposite directions) to change the directionality of flow. Because the ullage gas 16 is stored and contained within this essentially closed-system between tanks 12, 112, when NEA (or other inert gas) continues to be added to the system 110, there may be a net addition of ullage gas 16, which may cause the pressure in one or both of the tanks 12, 112 to increase to a point that the respective CDVs 34, 134 open to vent ullage 16 and depressurize the tank(s) 12, 112. The time required to reach such level would depend on the NEA flow rate, the ullage volume, and the CDV 34, 134 preset cracking pressure.

Figure 5:
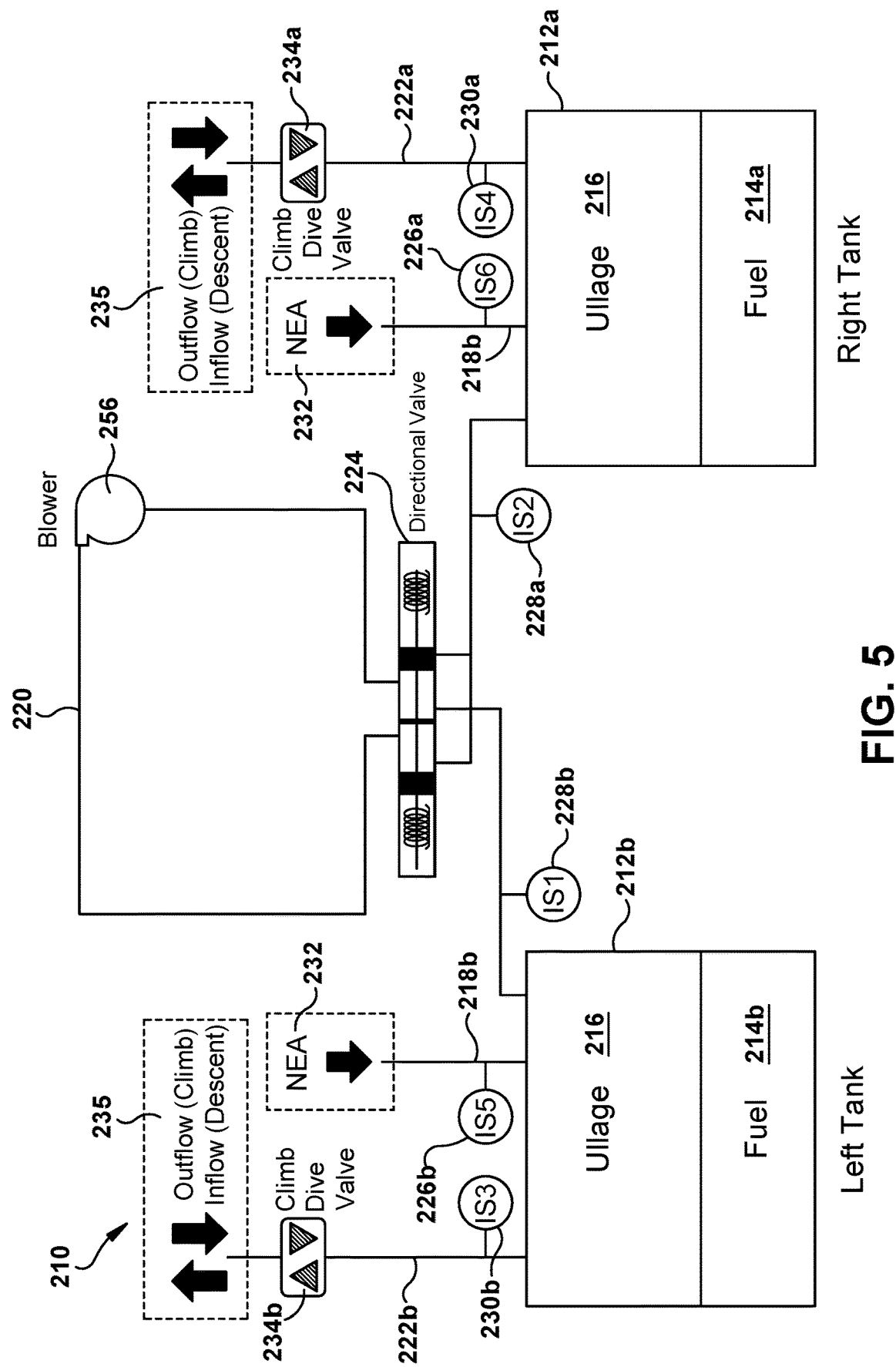
FIGS. 5-7 show another exemplary embodiment of a fuel gauging system having two tanks and a fluid circuit therebetween including an exemplary directional control valve and blower for transporting the ullage gas back and forth between the tanks.
Figure 6:
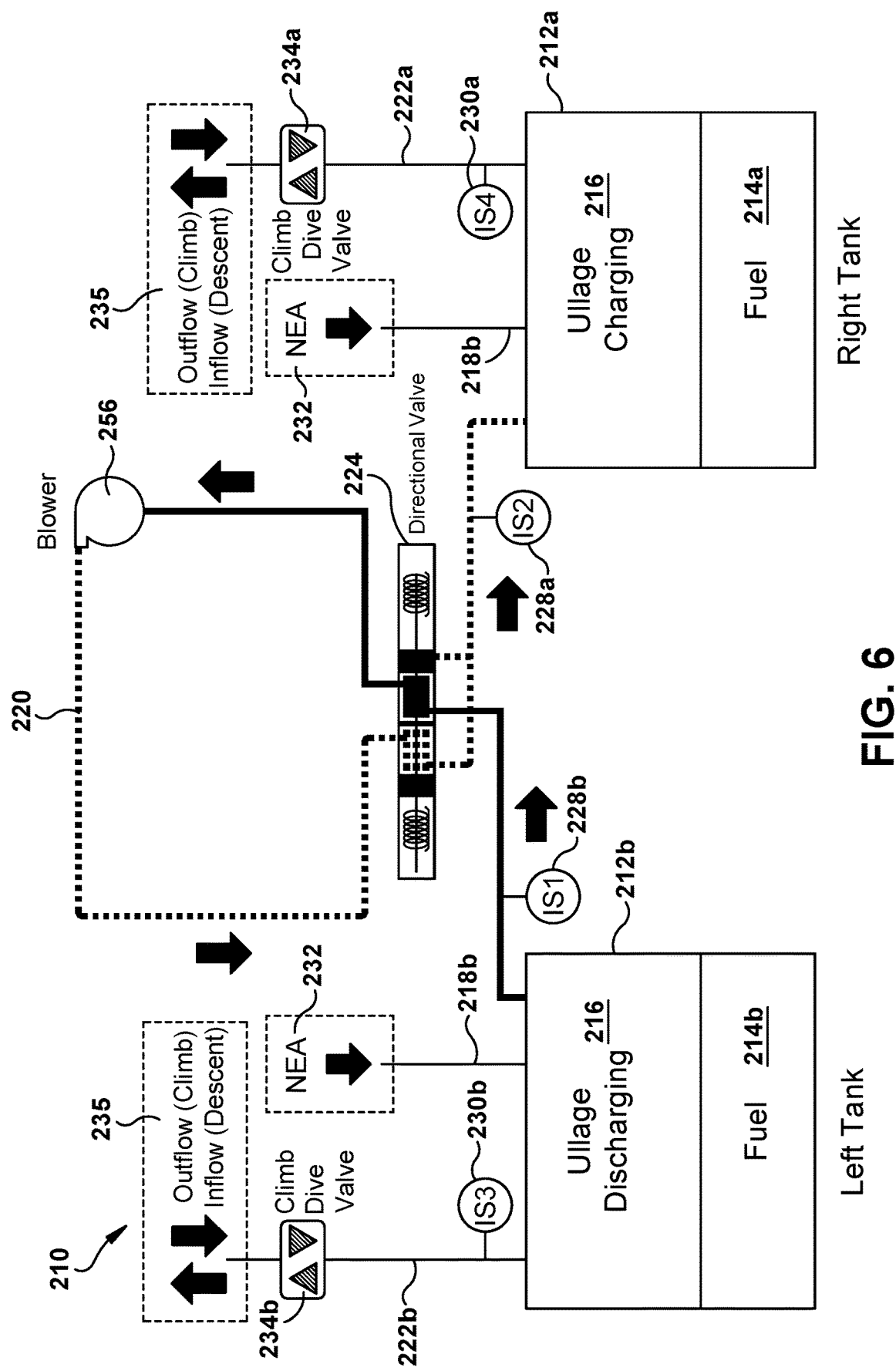
Figure 7:
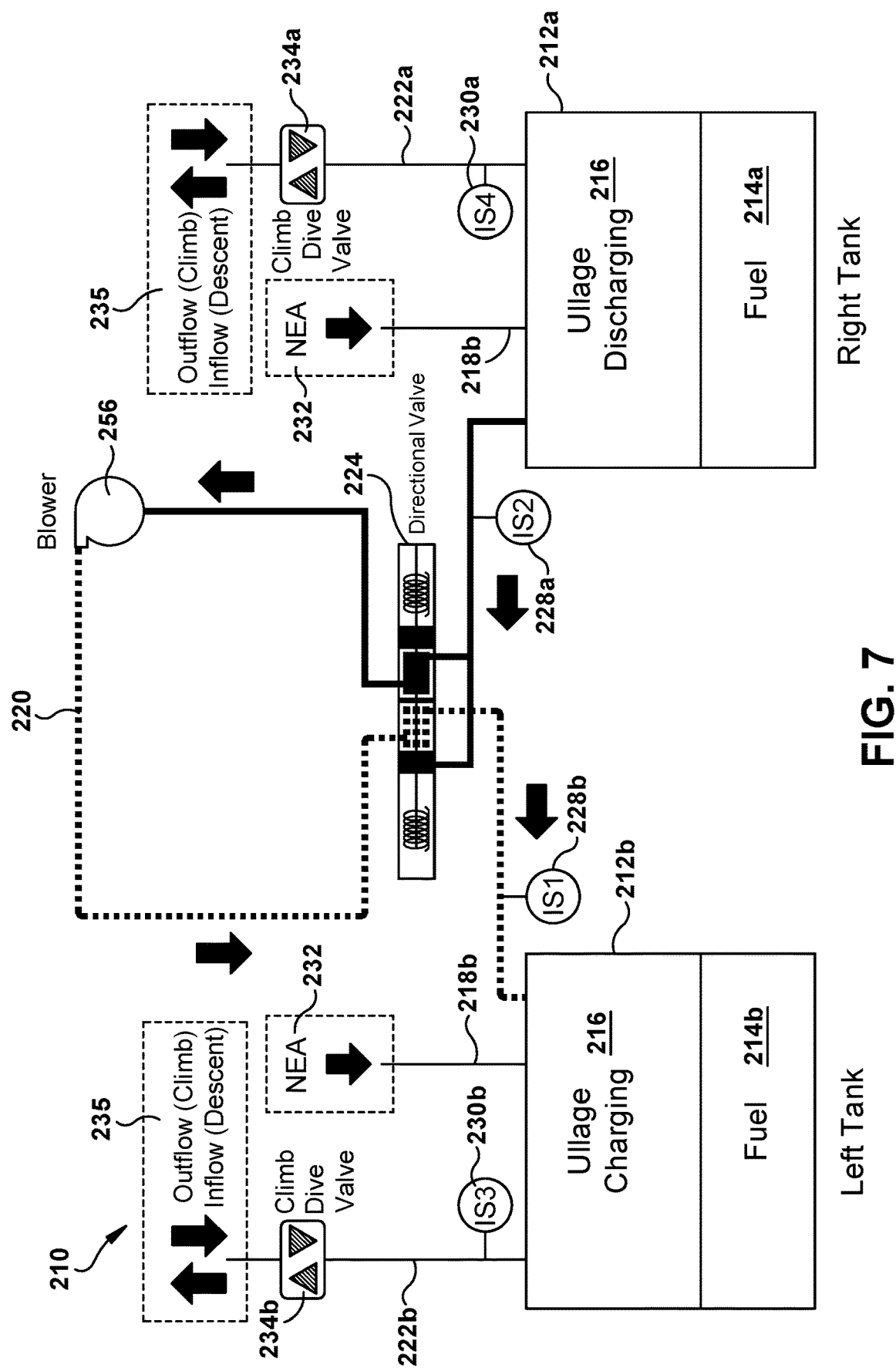

FIGS. 5-7 show another exemplary embodiment of a fuel gauging system 210 having at least two tanks 212a, 212b. The fuel gauging system is substantially similar to the above-referenced fuel gauging system 10, 110, and consequently the same reference numerals but in the 200-series are used to denote structures corresponding to the same or similar structures in the fuel gauging systems 10, 110, 210. In addition, the foregoing description of the fuel gauging system 10, 110 is equally applicable to the fuel gauging system 210, except as noted below. It is also understood that aspects of the fuel gauging systems 10, 110, 210 may be substituted for one another or used in conjunction with one another where applicable.

As shown in the illustrated embodiment of FIGS. 5-7, the fuel gauging system 210 is integrated with the at least two fuel tanks 212a, 212b, such as in wings of an aircraft, which are fluidly coupled by a fluid circuit 220 having a blower 256 (or pump) and a two-position directional control valve 224. In this example, the two-position directional control valve 224 is a double-acting solenoid on a spool valve; however, it could be any one of a variety of two-position directional valves. As shown, the source 232 of the ullage gas 216 (e.g., NEA) may be ported into each of the tanks 212a, 212b via additional intake lines 218a, 218b and penetrations in the tank, which this source 232 of NEA may be integrated into one inerting system as is conventional on aircraft. Alternatively, the inerting system may be integrated into the fluid circuit 220, as described in exemplary embodiments below.

Referring to FIG. 6, the directional control valve 224 is shifted such that the gauging system 210 simultaneously pressurizes the first fuel tank 212a by charging with ullage gas 216 while depressurizing the second fuel tank 212a by discharging ullage gas 216. FIG. 7 shows this process reversed by shifting the two-position directional valve 224. In this way, a fixed quantity of ullage gas 216 can be transferred back and forth between the two fuel tanks 212a, 212b, thus preserving the reduced oxygen concentration achieved in the ullage gas 216, such as with an aircraft with a fuel tank inerting system. In this paired tank system, the inlet lines and the discharge lines are shared as one common inlet/outlet line 220 forming part of the circuit 220. Thus, where the inlet line and discharge line would be two distinct lines on individual tanks, as discussed above in connection with FIG. 1 or FIG. 2, they may be combined into a single line 220 coupling each of the two tanks 212a, 212b. As shown, in the paired tank system, each tank 212a, 212b has a vent line 222a, 222b and CDV 234a, 234b. Also as shown, one or more of these fluid conduit lines include instrumentation 226a, 226b, 228a, 228b, 230a, 230b (including sensors 38, 40, and/or 42 and controller or processor 37, shown in FIG. 2) for calculating the quantity of fuel 214a, 214b in each tank 212a, 212b during such pressurizing or depressurizing conditions, in the manner as described above.

FIGS. 8-13 show other exemplary embodiments of fuel gauging systems 310, 410 which incorporate inerting systems 360, 460 into the above-described fuel gauging system 210. Accordingly, the same reference numerals from the fuel gauging system 210 will be used to denote the same structures in the fuel gauging systems 310, 410. As described above, the operational characteristics of the inerting systems 360, 460 may be used to infer one or more values of temperature, mass flow rate, and/or gas composition for calculating the volume of ullage gas in each tank, and thus the quantity of fuel in each tank of the systems 310, 410.

Figure 8:
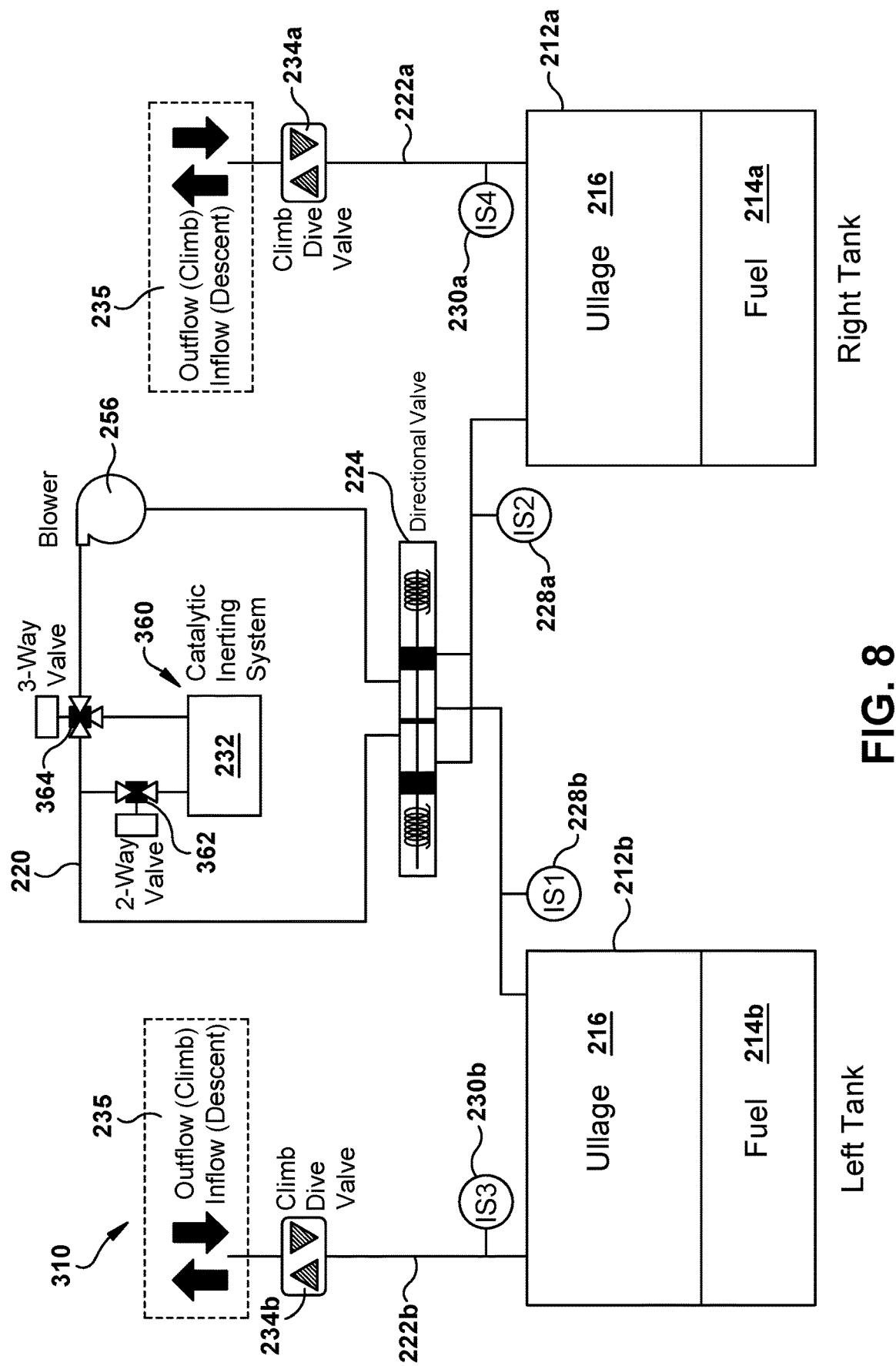
FIGS. 8-10 show another exemplary embodiment of a fuel gauging system with two tanks integrated with a catalytic inerting system.
Figure 9:
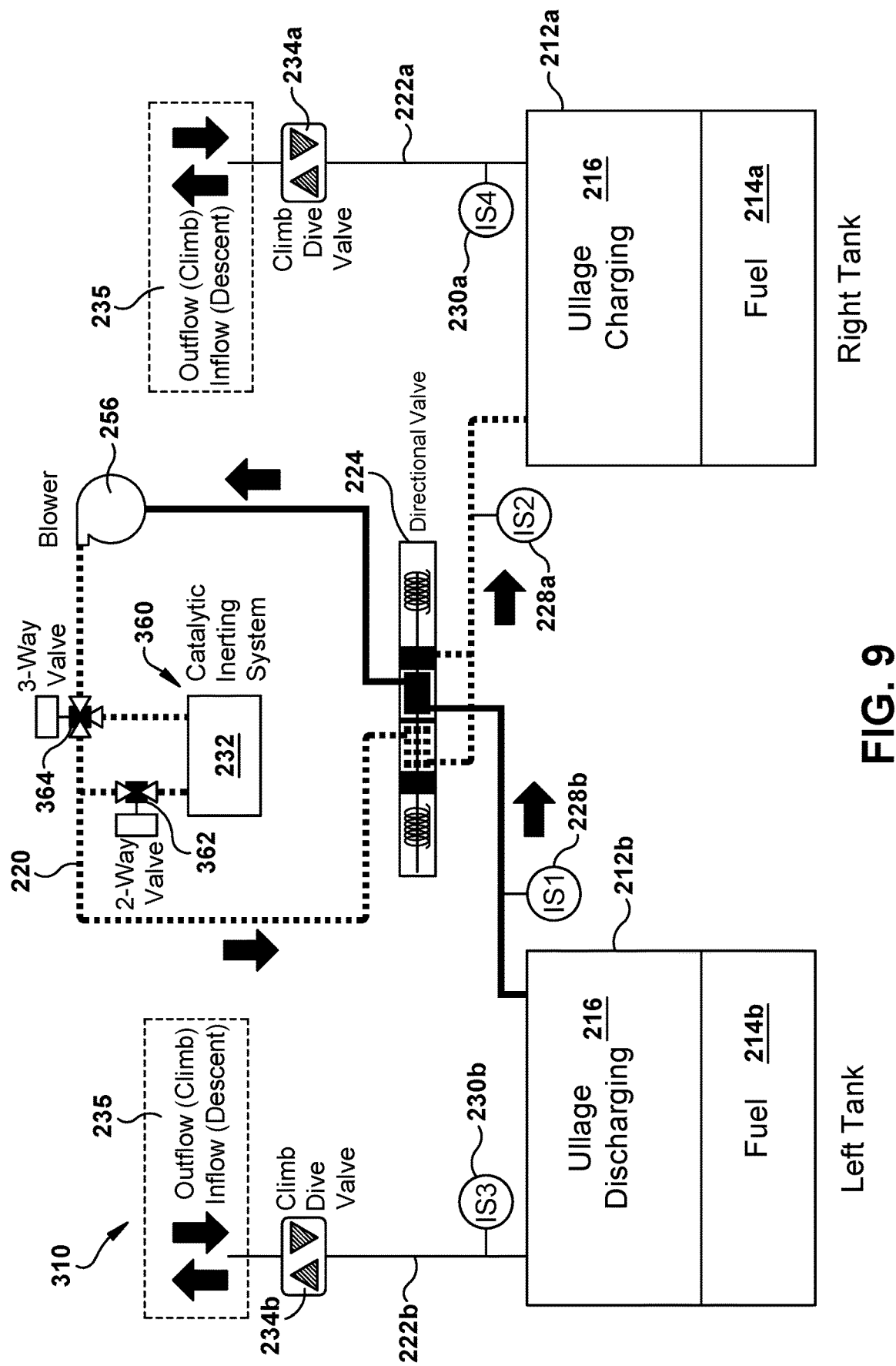
Figure 10:
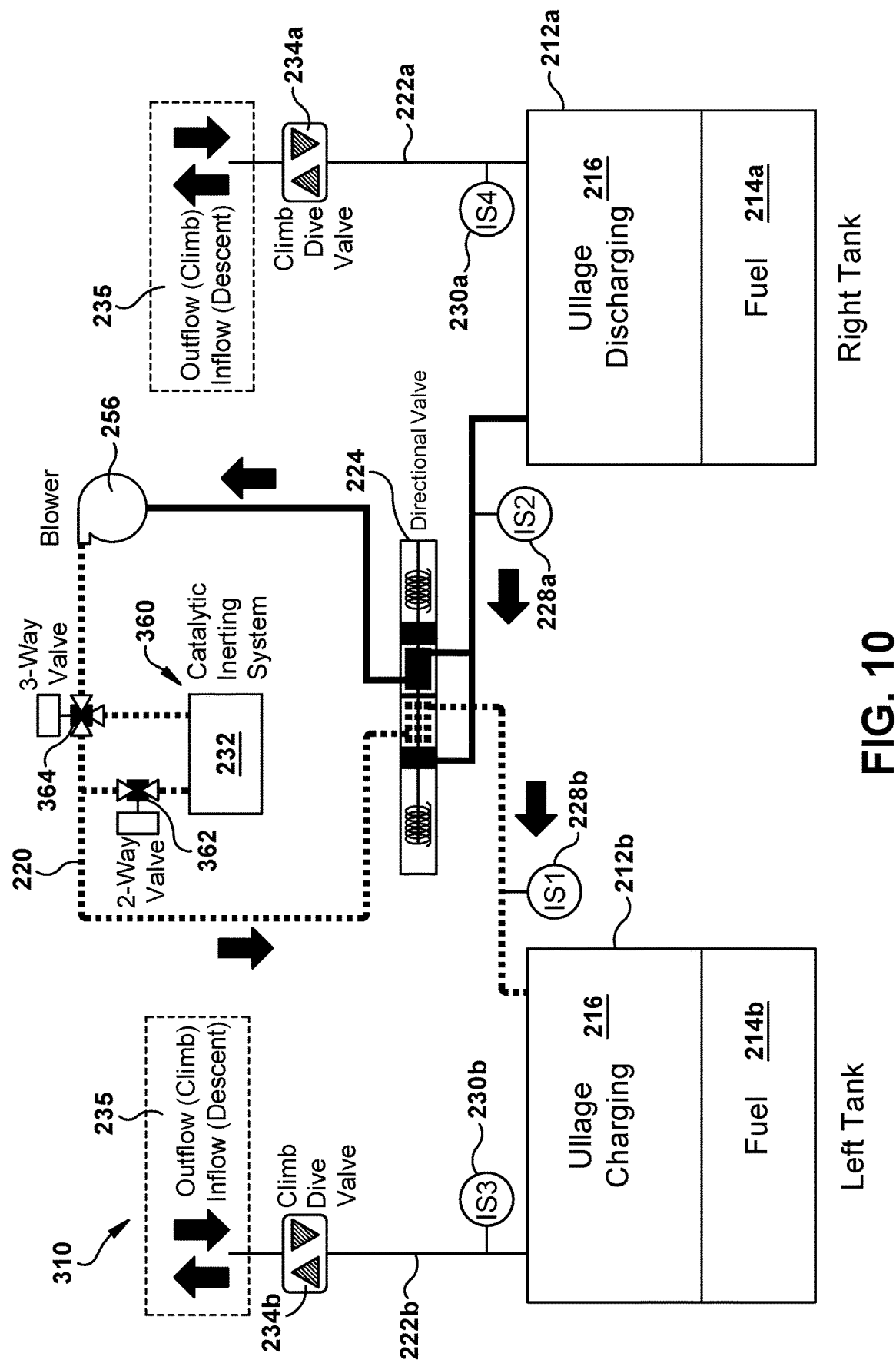

Referring to FIGS. 8-10, the fuel tank inerting system 360 is a catalytic inerting system 360 as the source 232 of NEA. As shown, the catalytic inerting system 360 is integrated into the fluid circuit 220 using a two-way valve 362 and a three-way valve 364. The catalytic inerting system 360 already relies on a blower to move ullage gas to and from the system. Thus, the blower 256 used to drive the circulating flow of ullage gas 216 through the inerting system can be used to drive the flow of ullage gas 216 between the tanks 212a, 212b to pressurize and depressurize the tanks via shifting of the directional control valve 224. FIG. 9 shows the directional control valve 224 shifted such that the gauging system simultaneously pressurizes the first fuel tank 212a while depressurizing the second fuel tank 212b. FIG. 10 shows this process reversed by shifting the two-position directional valve 224. The instrumentation (e.g., 228a, 228b, 230a, 230b) including controller or processor 37 (FIG. 2) are used to calculate the quantity of fuel 214a, 214b in each tank 212a, 212b during such pressurizing or depressurizing conditions, as described above.

Figure 11:
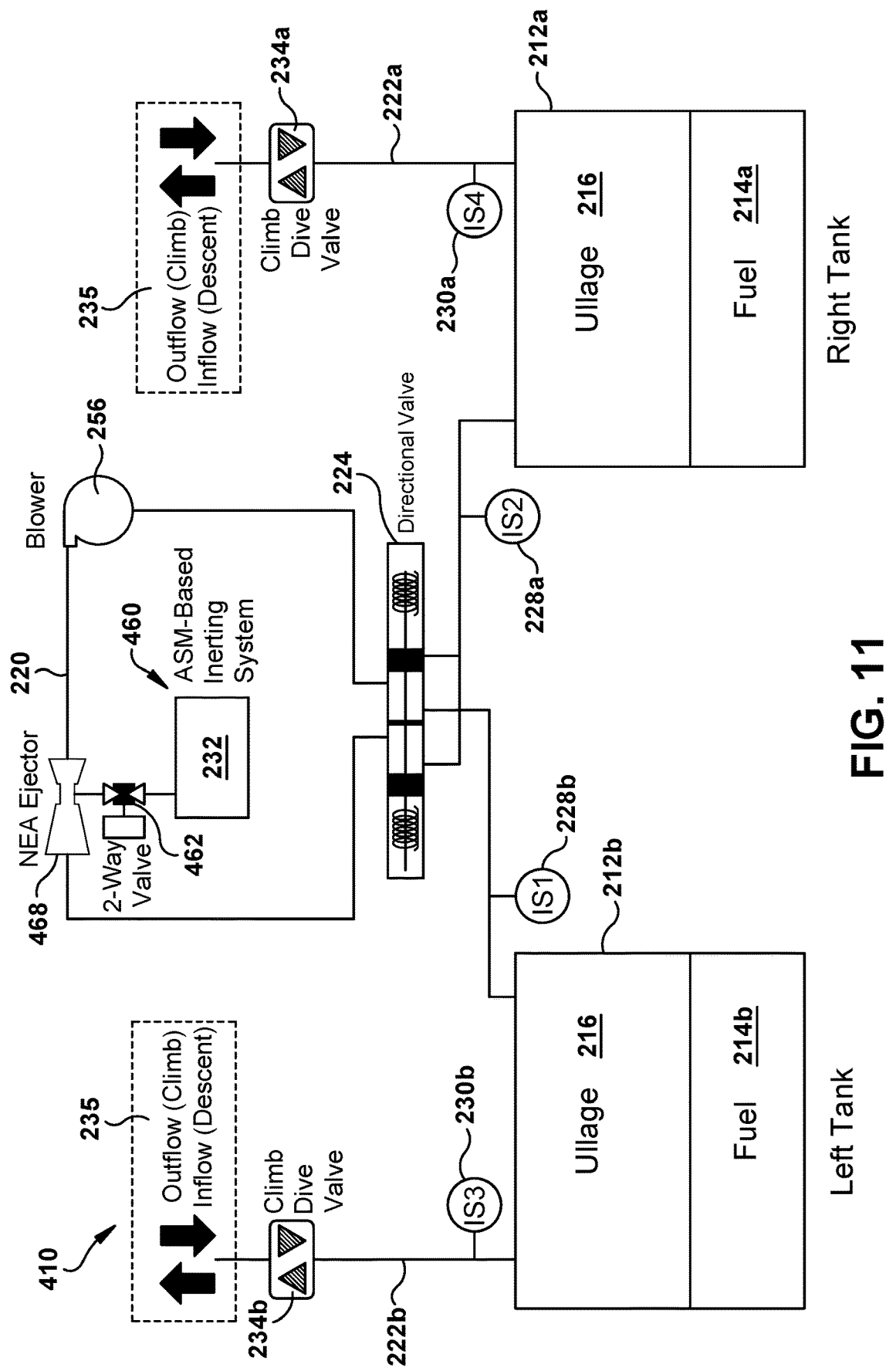
FIGS. 11-13 show another exemplary embodiment of a fuel gauging system with two tanks integrated with an air separation module based fuel tank inerting system.
Figure 12:
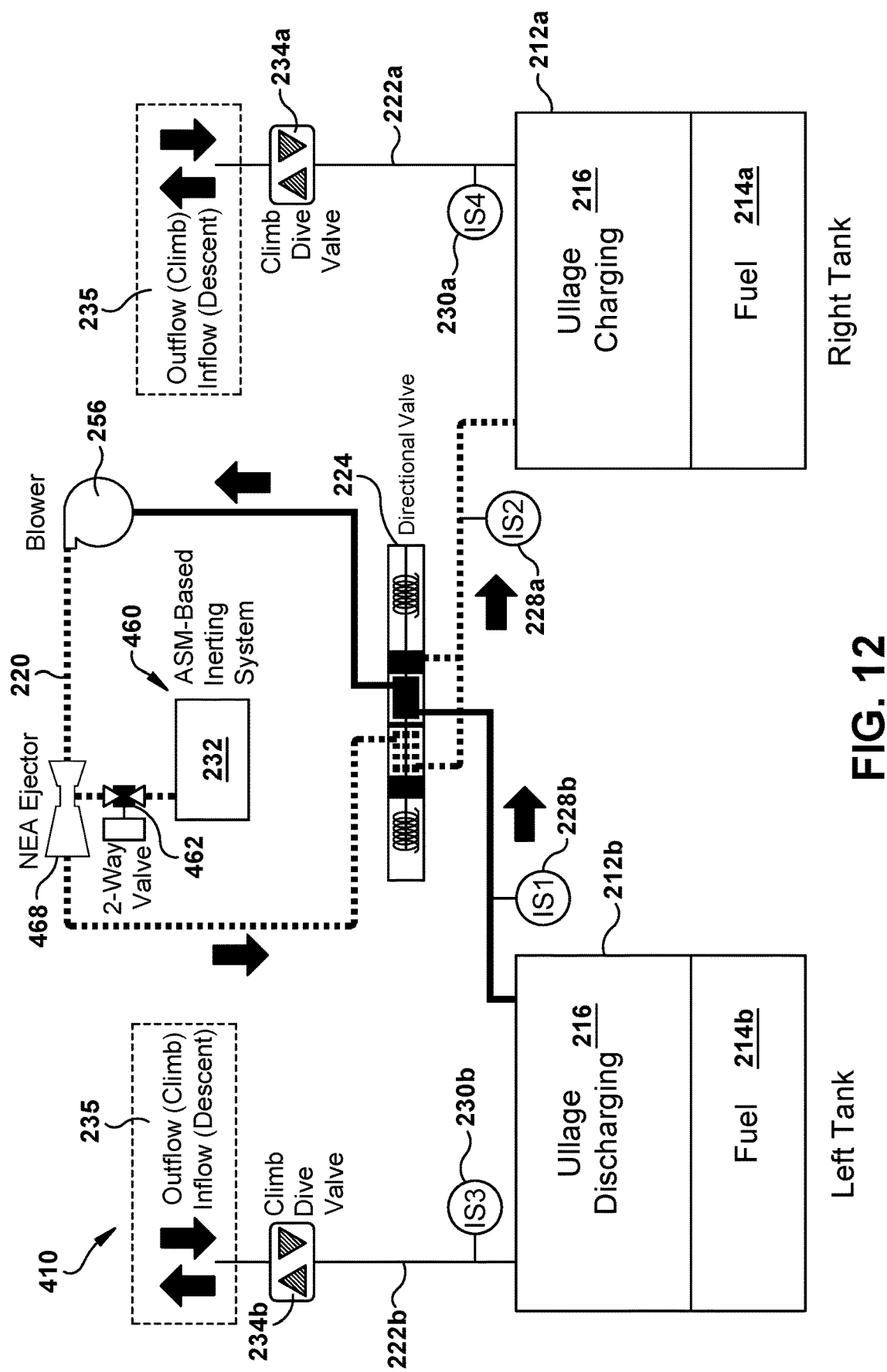
Figure 13:
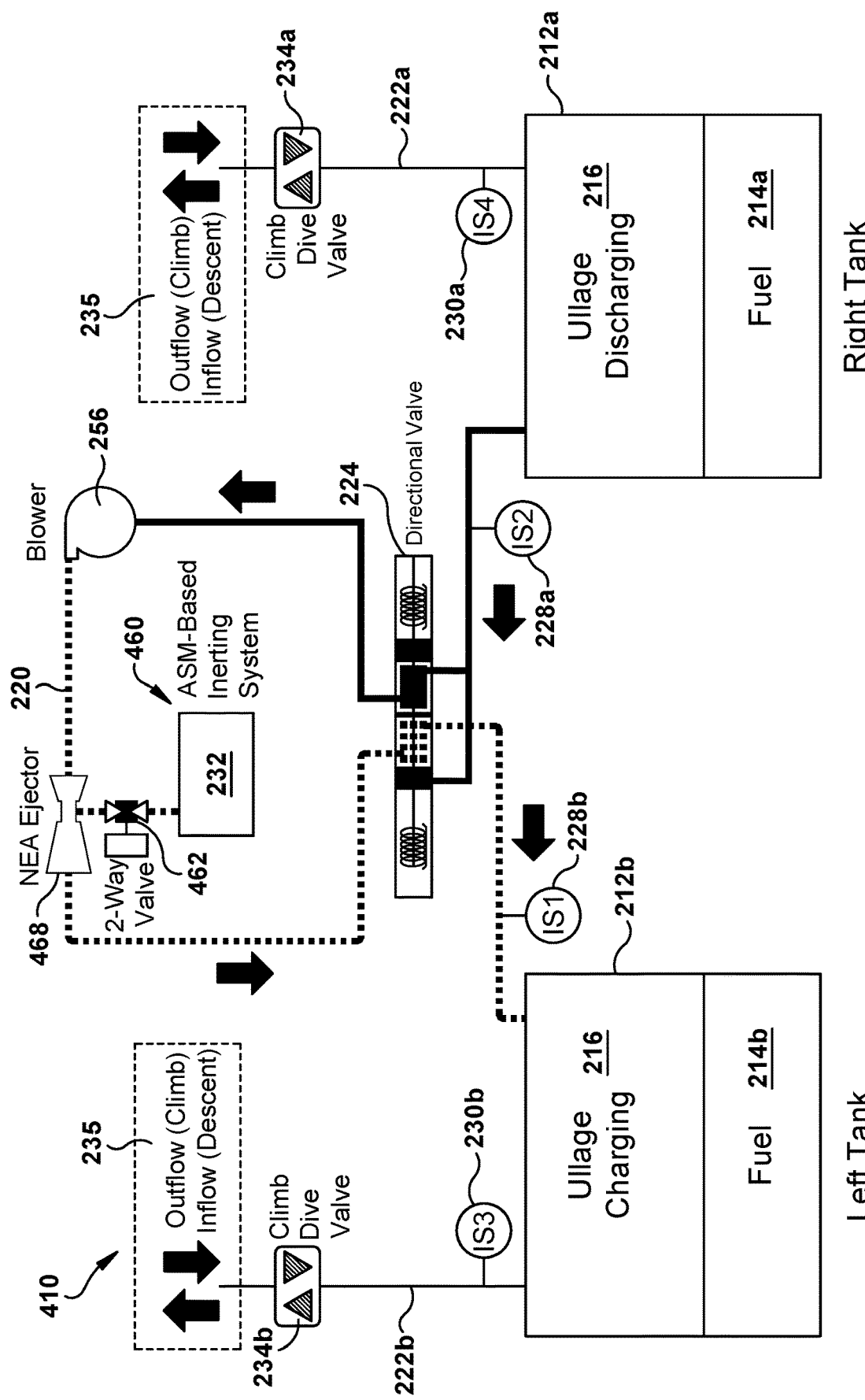

Referring to FIGS. 11-13, the fuel tank inerting system 460 is an ASM-based fuel inerting system 460 as the source 232 of NEA. As shown, a discharge stream from the ASM-based inerting system 460 is integrated into the fluid circuit 220 using a two-way valve 462 fluidly connected to an ejector pump 468. The ejector pump 468 drives at least some of the ullage gas flow between the tanks 212a, 212b. In the illustrated embodiment, the blower 256 may be included in the system 410 for redundancy to ensure operation of the fuel gauging system if the ASM-based fuel inerting system 460 is not operational at a particular time.

Exemplary fuel gauging systems have been described herein in which the fuel gauging system measures the quantity of fuel in the tank by measuring the ullage gas in an ullage of the tank. The fuel gauging system pressurizes or depressurizes the ullage gas and measures changes in conditions of the ullage gas to determine ullage gas volume and thus volume of the fuel. The system may infer one or more values in the volume calculation to reduce the number of measurements involved. The inferred values may come from known operating characteristics of an inerting system integrated with the fuel gauging system. The system may use a control valve that operates within the limits of a climb-dive valve to generate the system response. The control valve may control delivering or receiving ullage gas from another tank to preserve the ullage gas. An inerting system may be integrated into such a paired-tank fuel gauging system.

As described above, in the exemplary fuel gauging system (FGS) (or negative space gauging system NSGS) disclosed herein does not directly interrogate the liquid fuel in order to the determine the volume of fuel in the tank. As described, the ullage gas over the liquid fuel inside the tank is treated like a pneumatic spring. By sequentially pressurizing and depressurizing the ullage gas over the liquid fuel, and by measuring the mass of gas required to generate a corresponding pressure response inside the ullage, both the volume of the ullage gas and the volume of liquid fuel can be determined.

Beneficially, there is no requirement to know the location or orientation of the free surface to calculate a volume. Instead the FGS/NSGS can determine volume from ullage pressure, ullage temperature, and an integrated measurement of mass flow. Some of these measurements can be inferred, which may be facilitated by integration with other components or systems having known operating conditions. Moreover, one or more of such measurements can be made outside of the fuel tank, eliminating the need for wires and components inside the fuel tank.

By treating the ullage like a pneumatic spring, its volume may be determined. When the ullage volume is calculated, it can be subtracted from the internal volume of the tank to determine the liquid fuel volume. In exemplary embodiments, this functionality is realized by introducing a supply of air or inert gas into the ullage and measuring the quantity of air required to achieve a corresponding increase in ullage pressure. Also, the ullage may be depressurized in a similar fashion wherein the mass of ullage gas discharging from the tank is measured along with the corresponding reduction in ullage pressure.

In one exemplary embodiment, at least a pair of tanks are used simultaneously, wherein one tank is pressurized while the other tank is depressurized. The cycle is then reversed. In this way, a fixed quantity of gas can be transferred back and forth between the tanks. Such a system can preserve the reduced oxygen concentration in an aircraft with a fuel tank inerting system. This system may be introduced into any aircraft and would work especially well on an aircraft with paired fuel tanks. Moreover, this system may be neatly integrated with a fuel tank inerting system. In the case of an ASM inerting system, the discharge stream from the inerting system could be used in combination with an ejector pump to drive some or all of the flow between tanks. In the case of a catalytic inerting system, the blower required to drive the circulating flow of ullage gas through the inerting system could be used to also drive the flow between tanks. In either case, an additional, redundant blower may be needed to ensure operation of the fuel gauging system when the inerting system is not operational for whatever reason.

The FGS/NSGS allows for the elimination of fuel gauging components such as wires and cap probes from the interior space of the fuel tank. This makes servicing of the gauging system easier and reduces the number of maintenance-related fuel tank entries. With no gauging components touching the liquid fuel, the NSGS should make for longer component life and higher reliability than a capacitance (cap) probe system.

The elimination of wires in the fuel tank is friendly to FAR 25.981 (the FAA airworthiness requirement that relates to fuel tank flammability).

The elimination of cap probes in the fuel tank also can overcome deficiencies of the cap probe system. In a cap probe system, the cap probes may extend from the top of the inside of the tank to the bottom. An example of a deficiency associated with this feature is that during a helicopter high-g event, such as an autorotation landing, the cap probes pose a risk of penetration in that they may poke out of the tank and allow for fuel to leak.

The FGS/NSGS can utilize components that are generally commercially available. The FGS/NSGS has fewer components than a cap probe system, which should make for a lower mass, lower cost, and higher reliability system. Thus, the FGS/NSGS is insensitive to inertial loading and free surface location (e.g., the free surface does not need to be characterized relative to the tank geometry) and fuel type and composition (e.g., the cap probe systems can be affected by variations in fuel type, fuel additives, fuel permittivity as well as the presence of water and other contaminants in the fuel).

The FGS/NSGS can be elegantly integrated with an ASM-based inerting system or Catalytic Inerting System, and the NSGS can provide data relating to ullage gas composition and temperature for both the fuel tank inerting system as well as the fuel gauging system. The FGS/NSGS also can be incorporated into a closed-vent fuel tank.

According to an aspect, a fuel gauging system includes: a fuel tank configured to contain liquid or solid fuel and an ullage gas in an ullage of the fuel tank; at least one fluid conduit fluidly connected to the fuel tank; a pressure sensor configured to measure a pressure of the ullage gas in the fuel tank; a control valve fluidly connected to the at least one fluid conduit, the control valve being configured to control flow of ullage gas into or out of the fuel tank to change a pressure of the ullage gas in the fuel tank; and at least one electronic processor configured to: (i) receive pressure readings from the pressure sensor over a measurement interval, (ii) calculate a change in pressure of the ullage gas in the fuel tank over the measurement interval based upon the pressure readings, and (iii) calculate a quantity of the liquid or solid fuel in the fuel tank based at least upon: (a) the calculated change in pressure of the ullage gas in the fuel tank over the measurement interval, (b) at least one inferred temperature value in a calculation of temperature change of the ullage gas in the fuel tank over the measurement interval, and (c) at least one inferred mass value or mass flow rate value in a calculation of mass or mass flow rate change of the ullage gas into and/or out of the fuel tank over the measurement interval.

Embodiments may include one or more of the following additional features, separately or in any combination.

In some embodiments, the system further includes: at least one flow rate sensor configured to measure a flow rate of ullage gas into or out of the tank at a first time of the measurement interval or at a second time of the measurement interval, wherein the at least one inferred mass value or mass flow rate value is inferred to be the same or within a predefined range of the measured flow rate at the first time or the second time based at least upon an assumed constant flow rate of ullage gas over the measurement interval.

In some embodiments, the system further includes: at least one temperature sensor configured to measure a temperature of the ullage gas in the tank at the first time or the second time, wherein the at least one inferred temperature value is inferred to be the same or within a predefined range of the measured temperature at the first time or the second time based at least upon an assumed constant temperature of the ullage gas in the fuel tank over the measurement interval.

In some embodiments, the system is in combination with an inerting system that is fluidly connected with the fuel gauging system to deliver the ullage gas to the fuel tank, wherein: the at least one inferred mass value or mass flow rate value is inferred based at least upon a defined output flow rate of the ullage gas from the inerting system to the fuel tank; and/or the at least one inferred temperature value is inferred based at least upon a defined output temperature of the ullage gas from the inerting system to the fuel tank.

In some embodiments, the system is in combination with an inerting system that is fluidly connected with the fuel gauging system to deliver the ullage gas to the fuel tank, wherein: the at least one fluid conduit includes a discharge line, and a temperature sensor is fluidly connected to the discharge line to measure a temperature of ullage gas discharged from the fuel tank at a first time or a second time of the measurement interval, and wherein the at least one inferred temperature value is inferred to be the same or within a predefined range of the measured temperature at the first time or the second time based at least upon an assumed constant temperature of the ullage gas in the fuel tank over the measurement interval; the inerting system is fluidly connected to the fuel tank via an intake line, and the inerting system includes a fixed restriction orifice that delivers ullage gas from the inerting system through the intake line to the fuel tank at a defined flow rate, and the at least one inferred mass value or mass flow rate value is inferred based at least upon the defined flow rate provided by the fixed restriction orifice of the inerting system.

In some embodiments, the electronic processor is part of, or is operatively coupled to, at least one controller, the at least one controller being configured to successively increase and decrease the pressure of the ullage gas by controlling the control valve, and wherein the successive increase and decrease of the pressure of the ullage gas is cycled continuously over a period of time to provide a signal that is associated with one or more of mass flow rate, pressure, temperature, and oxygen concentration.

In some embodiments, the at least one fluid conduit includes a discharge line and an intake line, wherein the ullage gas is continuously fed into the fuel tank via the intake line, and wherein the control valve is operatively mounted in the discharge line and is configured to control the change in pressure of ullage gas in the tank by controlling discharge of the ullage gas via the discharge line.

In some embodiments, the system further includes a climb-dive fluid line having a climb-dive valve that operates at a preset upper pressure limit, and wherein the control valve is configured to control the change in pressure in a range that is below the preset upper pressure limit of the climb-dive valve. In some embodiments, the system further includes a second tank fluidly connected to the fuel tank via the at least one fluid conduit for transporting ullage between the fuel tank and the second tank; wherein the control valve is configured to control the transport of ullage gas between the fuel tank and the second tank.

In some embodiments, the at least one fluid conduit forms at least part of a fluid circuit between the fuel tank and the second tank, the fluid circuit having a blower fluidly coupling the fuel tank and the second tank, and wherein the control valve is a directional control valve that is configured to shift pressure between respective ullages of the fuel tank and the second tank.

In some embodiments, the system is in combination with an air separation module-based inerting system that is fluidly connected with the fuel gauging system, the air separation module-based inerting system having a nitrogen-enriched air ejector and a blower that are configured to deliver nitrogen-enriched air to at least the fuel tank.

In some embodiments, the system is in combination with a catalytic inerting system that is fluidly connected with the fuel gauging system, the catalytic inerting system having a reactor and a blower that are configured to deliver nitrogen-enriched air to the fuel tank.

According to another aspect, a fuel gauging system includes: a first tank configured to contain liquid or solid fuel and an ullage gas in an ullage of the first tank; a second tank fluidly connected to the first tank via at least one fluid conduit for transporting ullage between the first and second tank; a control valve fluidly connected to the at least one fluid conduit, the control valve being configured to control the transport of ullage gas between the first tank and the second tank; at least one sensor configured to measure at least one of: (i) temperature of the ullage gas in the first tank; (ii) pressure of the ullage gas in the first tank; and (iii) flow rate of the ullage gas into or out of the first tank; and at least one electronic processor configured to calculate a quantity of the liquid fuel in the first tank based at least upon measurement data from the at least one sensor.

Embodiments may include one or more of the foregoing or following additional features, separately or in any combination.

In some embodiments, the second tank is a second fuel tank configured to contain liquid or solid fuel and the ullage gas in an ullage of the second tank.

In some embodiments, a climb-dive fluid line having a climb-dive valve is fluidly connected to the first tank, the climb-dive valve being configured to operate at a preset upper pressure limit, and wherein the control valve is configured to control a change in pressure of the ullage gas in the first tank within a pressure range that is below the preset upper pressure limit of the climb-dive valve In some embodiments, the system includes: at least one flow sensor that measures a rate of flow of the ullage gas into the first tank and out of the first tank at respective first and second times of a measurement interval; at least one temperature sensor that measures a temperature of the ullage gas in the fuel tank at the first and second times; at least one pressure sensor that measures a pressure of the ullage gas in the fuel tank at the first and second times; and wherein the at least one electronic processor is configured to calculate a quantity of the liquid fuel in the first tank based at least upon respective measurement data at the first and second times from the at least one flow sensor, the at least one temperature sensor, and the at least one pressure sensor.

In some embodiments, the at least one sensor includes at least one pressure sensor, at least one flow rate sensor, and at least one temperature sensor respectively mounted in at least one fluid conduit of the fuel gauging system in proximity to the fuel tank.

In some embodiments, the electronic processor is configured to: calculate a change in mass of the ullage gas in the fuel tank by integrating an output of a flow sensor over a measurement interval from a first time to a second time; calculate a change in volume of fuel in the fuel tank by integrating an output of said second meter over said time interval; and calculate a quantity of fuel in the fuel tank at said second time based on the calculated changes in mass of gas and fuel in the fuel tank during said time interval and respective ullage temperature and pressure measurements taken by said first and second gauges at said first and second times.

According to another aspect, a method of determining a quantity of fuel in a system, includes: generating a measurable pressure differential in an ullage of a first fuel tank over a measurement interval; determining a change in pressure in the ullage over the measurement interval; determining a change in mass of the ullage gas or mass flow rate in the ullage over the measurement interval; determining a change in temperature of the ullage gas in the first fuel tank over the measurement interval; and calculating a volume of fuel in the first fuel tank by calculating a volume of the ullage gas using the determined change in pressure, the determined change in mass or mass flow rate, and the determined change in temperature of the ullage gas; wherein the generating the measurable pressure differential includes supplying ullage gas from a second tank fluidly connected to the first tank, and discharging ullage gas from the first tank to second tank.

In some embodiments, wherein the measurement interval starts at a first time and ends at a second time; wherein the determining the change in pressure includes measuring a first pressure of the ullage gas at said first time, and measuring a second pressure of the ullage gas at said second time; wherein the determining the change in temperature includes measuring a first temperature of the ullage gas at said first time, and measuring a second temperature of the ullage gas at said second time; and wherein the determining the change in mass or mass flow rate includes measuring a rate of flow of fuel at said first time and at said second time; wherein the calculating the volume of fuel is based at least upon measurement data acquired in the determining the change in pressure, temperature, and mass or mass flow rate.

According to another aspect, a method of determining a volume of fuel in a system, includes: generating a measurable pressure differential in an ullage of a first fuel tank; measuring a mass air flow rate necessary to generate the measurable pressure differential in the ullage; measuring an ullage temperature before and after pressurization; and calculating a volume of fuel in the first fuel tank using the measured pressure differential, the measured mass air flow rate, and the measured ullage temperatures.

Embodiments may include one or more of the following or foregoing additional features, separately or in any combination.

In some embodiments, the measurable pressure differential in the ullage is generated by successively pressurizing and depressurizing the ullage.

In some embodiments, the ullage is pressurized by introducing a high-pressure inerting gas from a discharge stream of an ASM-based inerting system.

In some embodiments, the ullage is pressurized by introducing a high-pressure inerting gas from a circulating flow of ullage gas from a catalytic inerting system.

In some embodiments, further comprising measuring an oxygen concentration of the ullage gas to determine a gas constant value.

In some embodiments, further comprising pressurizing and depressurizing the ullage in a range that is within a prescribed pressure differential of a CDV.

In some embodiments, further comprising pressurizing the ullage of the first tank using ullage gas from a second tank, while simultaneously depressurizing the ullage of the second tank, and subsequently reversing the cycle.

According to another aspect, a fuel gauging system, includes: a first tank having a first tank inlet/outlet and a first tank instrument suite having a pressure sensor, a temperature sensor, and a flow rate sensor; a second tank having a second tank inlet/outlet and a second tank instrument suite having a pressure sensor, a temperature sensor, and a flow rate sensor; a blower fluidly coupling the first tank inlet/outlet and the second tank inlet/outlet via a valve to shift pressure between respective ullage portions of the first tank and the second tank; a controller configured to use measurements of pressure, temperature and flow rates measured by the first instrument suite and measurements of pressure, temperature and flow rates measured by the second instrument suite are used to calculate a volume of space available in at least one of the first fuel tank and the second fuel tank.

Embodiments may include one or more of the following or foregoing additional features, separately or in any combination.

In some embodiments, further comprising a first climb-dive valve associated with the first tank and a second climb-dive valve associated with the second tank.

In some embodiments, the system is integrated into an inerting system.

In some embodiments, the inerting system is a catalytic inerting system.

In some embodiments, the inerting system is an air-separation module inerting system.

It is understood that embodiments of the subject matter described in this disclosure can be implemented in combination with digital electronic circuitry, controllers, processors, computer software, firmware, and/or hardware. For example, embodiments may be implemented in a fuel gauging system that uses one or more modules of computer program with instructions encoded on a non-transitory computer-readable medium for execution by, or to control the operation of, data processing apparatus. The operations may include physical manipulations of physical quantities. Usually, though not necessarily, the physical quantities take the form of electrical or magnetic signals capable of being stored, transferred, combined, compared, and otherwise manipulated in a logic and the like.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of the foregoing. The controller may include all apparatus, devices, and machines for processing data, including by way of example a programmable processor, a computer, or multiple processors or computers.

The controller may include all apparatus, devices, and machines for processing data, including electronic control circuitry that is configured to carry out various control operations relating to control of the above-mentioned system. The control circuitry may be special or general purpose circuitry. The controller may include, by way of example a programmable processor, a computer, or multiple processors or computers. For example, the primary control circuit may include an electronic processor, such as a CPU, microcontroller or microprocessor. The operative connection(s) of the controller to the system devices includes those in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. The controller may include, in addition to hardware, code that creates an execution environment for the computer program in question. Among their functions, to implement the features described herein, the control circuit and/or electronic processor may comprise an electronic controller that may execute program code embodied as the control application. It will be apparent to a person having ordinary skill in the art of computer programming, and specifically in application programming for electronic and communication devices, how to program the device to operate and carry out logical functions and instructions associated with the control application. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network.

The processor may include all apparatus, devices, electronic circuitry, and machines suitable for processing data, including the execution of a computer program. The processor may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

An "operative connection," or a connection by which entities are "operatively connected," also may be one in which signals, physical communications, or logical communications may be sent or received. Typically, an operative connection includes a physical interface, an electrical interface, or a data interface, but it is to be noted that an operable connection may include differing combinations of these or other types of connections sufficient to allow operative control. For example, two entities can be operatively connected by being able to communicate signals to each other directly or through one or more intermediate entities like a processor, operating system, a logic, software, or other entity. Logical or physical communication channels can be used to create an operative connection.

It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fuel gauging system comprising:
    a fuel tank configured to contain liquid or solid fuel and an ullage gas in an ullage of the fuel tank;
    at least one fluid conduit fluidly connected to the fuel tank;
    a pressure sensor configured to measure a pressure of the ullage gas in the fuel tank;
    a control valve fluidly connected to the at least one fluid conduit, the control valve being configured to control flow of ullage gas into or out of the fuel tank to change a pressure of the ullage gas in the fuel tank;
    a second fuel tank fluidly connected to the fuel tank via the at least one fluid conduit, the at least one fluid conduit being positioned for transporting ullage gas from the fuel tank to the second fuel tank and from the second fuel tank to the fuel tank, wherein the control valve is configured to control the transport of ullage gas from the fuel tank to the second tank and from the second fuel tank to the fuel tank to generate a pressure differential of the ullage gas in the fuel tank over a measurement interval, and to generate a second pressure differential of the ullage gas in the second fuel tank over the measurement interval;
    a second pressure sensor configured to measure a pressure of the ullage gas in the second fuel tank, and
    at least one electronic processor configured to:
    (i) receive pressure readings from the first and second pressure sensors over the measurement interval,
    (ii) calculate a change in pressure of the ullage gas in the fuel tank corresponding to the pressure differential in the fuel tank and a change in pressure of the ullage gas in the second fuel tank corresponding to the second pressure differential in the second fuel tank over the measurement interval based upon the received pressure readings, and
    (iii) calculate a quantity of the liquid or solid fuel in the fuel tank and/or the second fuel tank based at least upon:

(a) the calculated change in pressure of the ullage gas in the fuel tank and/or the calculated change in pressure of the ullage gas in the second fuel tank over the measurement interval,
(b) at least one inferred temperature value in a calculation of temperature change of the ullage gas in the fuel tank and/or temperature change of the ullage gas in the second fuel tank over the measurement interval, and
(c) at least one inferred mass value or mass flow rate value in a calculation of mass or mass flow rate change of the ullage gas into and/or out of the fuel tank and/or mass or mass flow rate change of the ullage gas into and/or out of the second fuel tank over the measurement interval.

2. The fuel gauging system according to claim 1, further comprising:
at least one flow rate sensor configured to measure a flow rate of ullage gas into or out of the tank at a first time of the measurement interval or at a second time of the measurement interval, wherein the at least one inferred mass value or mass flow rate value is inferred to be the same or within a predefined range of the measured flow rate at the first time or the second time based at least upon an assumed constant flow rate of ullage gas over the measurement interval; and/or at least one temperature sensor configured to measure a temperature of the ullage gas in the tank at the first time or the second time, wherein the at least one inferred temperature value is inferred to be the same or within a predefined range of the measured temperature at the first time or the second time based at least upon an assumed constant temperature of the ullage gas in the fuel tank over the measurement interval.

3. The fuel gauging system according to claim 1, in combination with an inerting system that is fluidly connected with the fuel gauging system to deliver the ullage gas to the fuel tank, wherein:
the at least one inferred mass value or mass flow rate value is inferred based at least upon a defined output flow rate of the ullage gas from the inerting system to the fuel tank; and/or
the at least one inferred temperature value is inferred based at least upon a defined output temperature of the ullage gas from the inerting system to the fuel tank.

4. The fuel gauging system according to claim 1, in combination with an inerting system that is fluidly connected with the fuel gauging system to deliver the ullage gas to the fuel tank, wherein:
the at least one fluid conduit includes a discharge line, and a temperature sensor is fluidly connected to the discharge line to measure a temperature of ullage gas discharged from the fuel tank at a first time or a second time of the measurement interval, and wherein the at least one inferred temperature value is inferred to be the same or within a predefined range of the measured temperature at the first time or the second time based at least upon an assumed constant temperature of the ullage gas in the fuel tank over the measurement interval;
the inerting system is fluidly connected to the fuel tank via an intake line, and the inerting system includes a fixed restriction orifice that delivers ullage gas from the inerting system through the intake line to the fuel tank at a defined flow rate, and the at least one inferred mass value or mass flow rate value is inferred based at least upon the defined flow rate provided by the fixed restriction orifice of the inerting system.

5. The fuel gauging system according to claim 1, wherein the electronic processor is part of, or is operatively coupled to, at least one controller, the at least one controller being configured to successively increase and decrease the pressure of the ullage gas by controlling the control valve, and wherein the successive increase and decrease of the pressure of the ullage gas is cycled continuously over a period of time to provide a signal that is associated with one or more of mass flow rate, pressure, temperature, and oxygen concentration.

6. The fuel gauging system according to claim 1,
wherein the at least one fluid conduit includes a discharge line and an intake line, wherein the ullage gas is continuously fed into the fuel tank via the intake line, and wherein the control valve is operatively mounted in the discharge line and is configured to control the change in pressure of ullage gas in the tank by controlling discharge of the ullage gas via the discharge line.

7. The fuel gauging system according to claim 6,
wherein the system further includes a climb-dive fluid line having a climb-dive valve that operates at a preset upper pressure limit, and wherein the control valve is configured to control the change in pressure in a range that is below the preset upper pressure limit of the climb-dive valve.

8. The fuel gauging system according to claim 1, wherein the at least one fluid conduit forms at least part of a fluid circuit between the fuel tank and the second fuel tank, the fluid circuit having a blower fluidly coupling the fuel tank and the second fuel tank, and wherein the control valve is a directional control valve that is configured to shift pressure between respective ullages of the fuel tank and the second fuel tank.

9. The fuel gauging system according to claim 1, in combination with an air separation module-based inerting system that is fluidly connected with the fuel gauging system, the air separation module-based inerting system having a nitrogen-enriched air ejector and a blower that are configured to deliver nitrogen-enriched air to at least the fuel tank.

10. The fuel gauging system according to claim 1, in combination with a catalytic inerting system that is fluidly connected with the fuel gauging system, the catalytic inerting system having a reactor and a blower that are configured to deliver nitrogen enriched air to the fuel tank.

11. A fuel gauging system comprises:
a first tank configured to contain liquid or solid fuel and an ullage gas in an ullage of the first tank;
a second tank fluidly connected to the first tank via at least one fluid conduit, the at least one fluid conduit being positioned for transporting ullage gas between the first and second tank;
a control valve fluidly connected to the at least one fluid conduit, the control valve being configured to control the transport of ullage gas from the first tank to the second tank and from the second tank to the first tank to generate a first pressure differential of the ullage gas in the first tank over a measurement interval, and to generate a second pressure differential of the ullage gas in the second tank over the measurement interval;
at least one sensor configured to measure at least one of:
(i) temperature of the ullage gas in the first tank and/or temperature of the ullage gas in the second tank; (ii) pressure of the ullage gas in the first tank and/or pressure of the ullage gas in the second tank; and (iii)

flow rate of the ullage gas into or out of the first tank and/or flow rate of the ullage gas into or out of the second tank; and at least one electronic processor configured to calculate a quantity of the liquid fuel in the first tank and/or a quantity of liquid fuel in the second tank based at least upon measurement data from the at least one sensor.

12. The fuel gauging system according to claim 11, wherein the second tank is a second fuel tank configured to contain the liquid or solid fuel and the ullage gas in an ullage of the second tank.

13. The fuel gauging system according to claim 11, wherein a climb-dive fluid line having a climb-dive valve is fluidly connected to the first tank, the climb-dive valve being configured to operate at a preset upper pressure limit, and wherein the control valve is configured to control a change in pressure of the ullage gas in the first tank within a pressure range that is below the preset upper pressure limit of the climb-dive valve.

14. The fuel gauging system according to claim 11, wherein the system includes:
at least one flow sensor that measures a rate of flow of the ullage gas into the first tank and out of the first tank at respective first and second times of a measurement interval;
at least one temperature sensor that measures a temperature of the ullage gas in the fuel tank at the first and second times;
at least one pressure sensor that measures a pressure of the ullage gas in the fuel tank at the first and second times; and
wherein the at least one electronic processor is configured to calculate a quantity of the liquid fuel in the first tank based at least upon respective measurement data at the first and second times from the at least one flow sensor, the at least one temperature sensor, and the at least one pressure sensor.

15. The fuel gauging system according to claim 11, wherein the at least one sensor includes at least one pressure sensor, at least one flow rate sensor, and at least one temperature sensor respectively mounted in at least one fluid conduit of the fuel gauging system in proximity to the fuel tank.

16. The fuel gauging system according to claim 11, wherein the electronic processor is configured to:
calculate a change in mass of the ullage gas in the fuel tank by integrating an output of a flow sensor over the measurement interval from a first time to a second time;
calculate a change in volume of fuel in the fuel tank by integrating an output of said second meter over said time interval; and
calculate a quantity of fuel in the fuel tank at said second time based on the calculated changes in mass of gas and fuel in the fuel tank during said time interval and respective ullage temperature and pressure measurements taken by said first and second gauges at said first and second times.

17. A method of determining a quantity of fuel in a system, comprising:
generating a measurable pressure differential in an ullage gas of a first fuel tank over a measurement interval;
generating a second measurable pressure differential in an ullage gas of a second fuel tank over the measurement interval
determining a change in pressure in the ullage gas of the first fuel tank and/or the ullage gas of the second fuel tank over the measurement interval;
determining a change in mass of the ullage gas of the first fuel tank or mass flow rate in the ullage gas of the first fuel tank and/or mass of ullage gas of the second fuel tank or mass flow rate in the ullage gas of the second fuel tank over the measurement interval;
determining a change in temperature of the ullage gas in the first fuel tank and/or the ullage gas in the second fuel tank over the measurement interval; and
calculating a volume of fuel in the first fuel tank and/or a volume of fuel in the second fuel tank by calculating a volume of the ullage gas of the first fuel tank and/or a volume of ullage of the second fuel tank using the determined change in pressure, the determined change in mass or mass flow rate, and the determined change in temperature of the ullage gas;
wherein the generating the measurable pressure differential and the generating the second measurable pressure differential includes supplying ullage gas from a second tank to the first tank and discharging ullage gas from the first tank to second tank, wherein the first tank and the second tank are fluidly connected such that ullage gas can be transported from the fuel tank to the second fuel tank and from the second fuel tank to the fuel tank via the fluid connection.

18. The method according to claim 17,
wherein the measurement interval starts at a first time and ends at a second time;
wherein the determining the change in pressure includes measuring a first pressure of the ullage gas at said first time, and measuring a second pressure of the ullage gas at said second time;
wherein the determining the change in temperature includes measuring a first temperature of the ullage gas at said first time, and measuring a second temperature of the ullage gas at said second time; and
wherein the determining the change in mass or mass flow rate includes measuring a rate of flow of fuel at said first time and at said second time;
wherein the calculating the volume of fuel is based at least upon measurement data acquired in the determining the change in pressure, temperature, and mass or mass flow rate.

* * * * *